US010671253B2

(12) United States Patent
Einaudi

(10) Patent No.: US 10,671,253 B2
(45) Date of Patent: Jun. 2, 2020

(54) SYSTEMS AND METHODS FOR GUIDED USER INTERFACE NAVIGATION

(71) Applicant: Caavo Inc, Santa Clara, CA (US)

(72) Inventor: Andrew E. Einaudi, San Francisco, CA (US)

(73) Assignee: Caavo Inc, Milpitas, CA (US)

( * ) Notice: Subject to any disclaimer, the term of this patent is extended or adjusted under 35 U.S.C. 154(b) by 250 days.

(21) Appl. No.: 15/249,124

(22) Filed: Aug. 26, 2016

(65) Prior Publication Data
US 2017/0060388 A1 Mar. 2, 2017

Related U.S. Application Data

(60) Provisional application No. 62/210,113, filed on Aug. 26, 2015.

(51) Int. Cl.
| | | |
|---|---|---|
| *G06F 3/0484* | (2013.01) | |
| *G06F 3/16* | (2006.01) | |
| *G06F 3/0482* | (2013.01) | |
| *G06F 3/0481* | (2013.01) | |
| *G06F 3/0488* | (2013.01) | |

(52) U.S. Cl.
CPC ........ *G06F 3/04842* (2013.01); *G06F 3/0481* (2013.01); *G06F 3/0482* (2013.01); *G06F 3/04817* (2013.01); *G06F 3/167* (2013.01); *G06F 3/0488* (2013.01); *G06F 3/04883* (2013.01)

(58) Field of Classification Search
CPC .. G06F 3/0482; G06F 3/0481; G06F 3/04842; G06F 3/04817; G06F 3/0488; G06F 3/04883; G06F 3/167
See application file for complete search history.

(56) References Cited

U.S. PATENT DOCUMENTS

| | | | | |
|---|---|---|---|---|
| 2005/0262533 A1* | 11/2005 | Hart | ...................... | G06F 3/0481 725/40 |
| 2010/0325259 A1* | 12/2010 | Schuler | ............... | G06F 11/3006 709/224 |
| 2011/0283232 A1* | 11/2011 | Jordan | ............... | H04N 5/44543 715/810 |
| 2012/0130978 A1* | 5/2012 | Li | ....................... | G06F 17/3064 707/706 |
| 2013/0174179 A1* | 7/2013 | Park | ...................... | G06F 9/4843 718/107 |
| 2014/0298254 A1* | 10/2014 | Peng | ..................... | G06F 3/0482 715/800 |

* cited by examiner

*Primary Examiner* — Tuyetlien T Tran
(74) *Attorney, Agent, or Firm* — Fiala & Weaver P.L.L.C.

(57) ABSTRACT

Techniques are described herein for a multimode graphical user interface (GUI), where a first mode of the GUI uses an unguided navigation model and a second mode uses a guided navigation model in which the GUI is distilled down to only its most critical elements. This may be achieved by sequentially displaying a single user interface element and removing all other user-interface elements of the GUI. The second mode of the GUI may lead a user through multiple options one at a time, thus creating a guided navigation model. The second mode may be initiated upon detecting a certain event (e.g., a period of inactivity, an explicit command from the user, etc.). The multimode GUI may be used to guide a user through one or more recommended items of media content from one or more different content-providing sources.

20 Claims, 29 Drawing Sheets

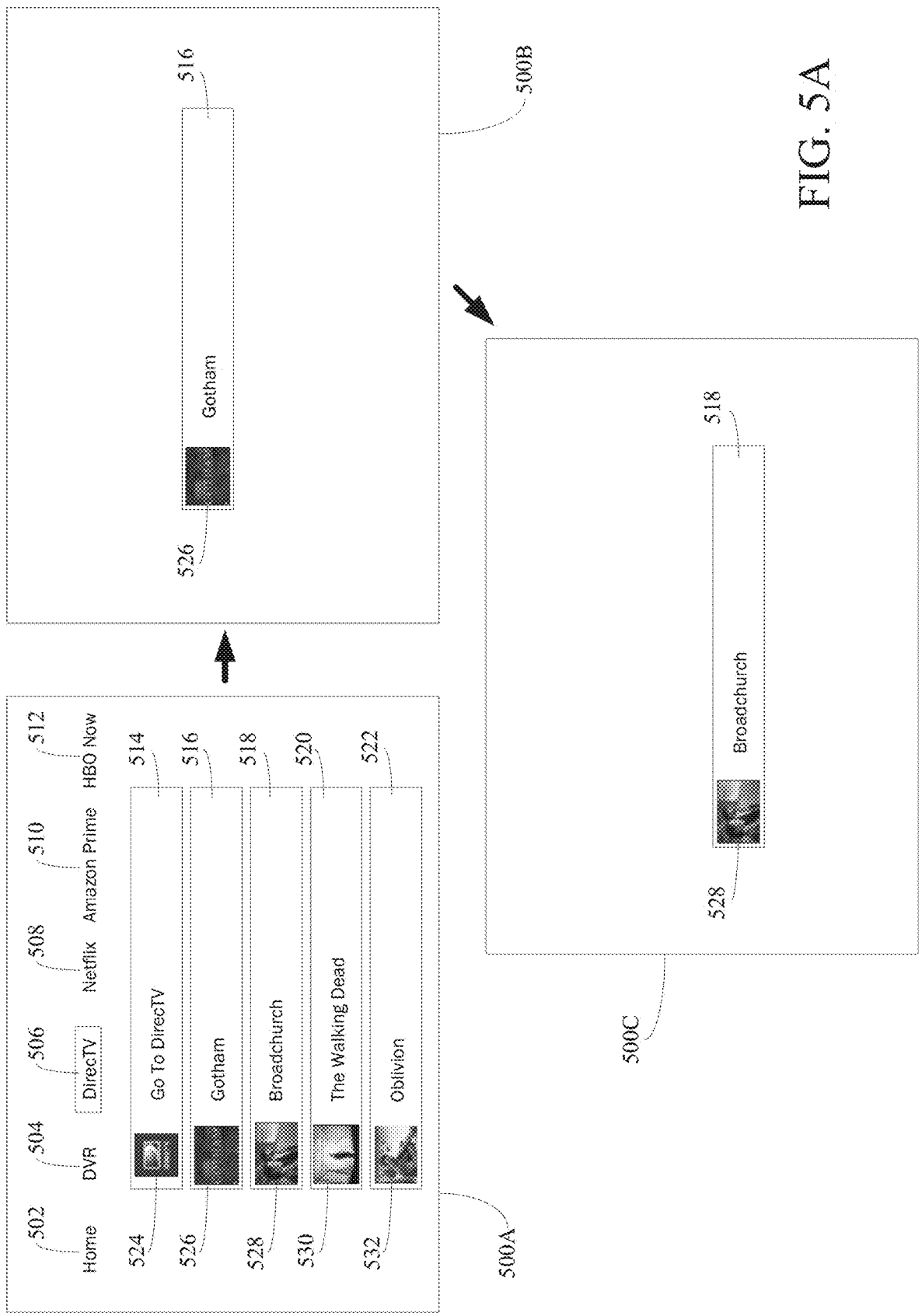

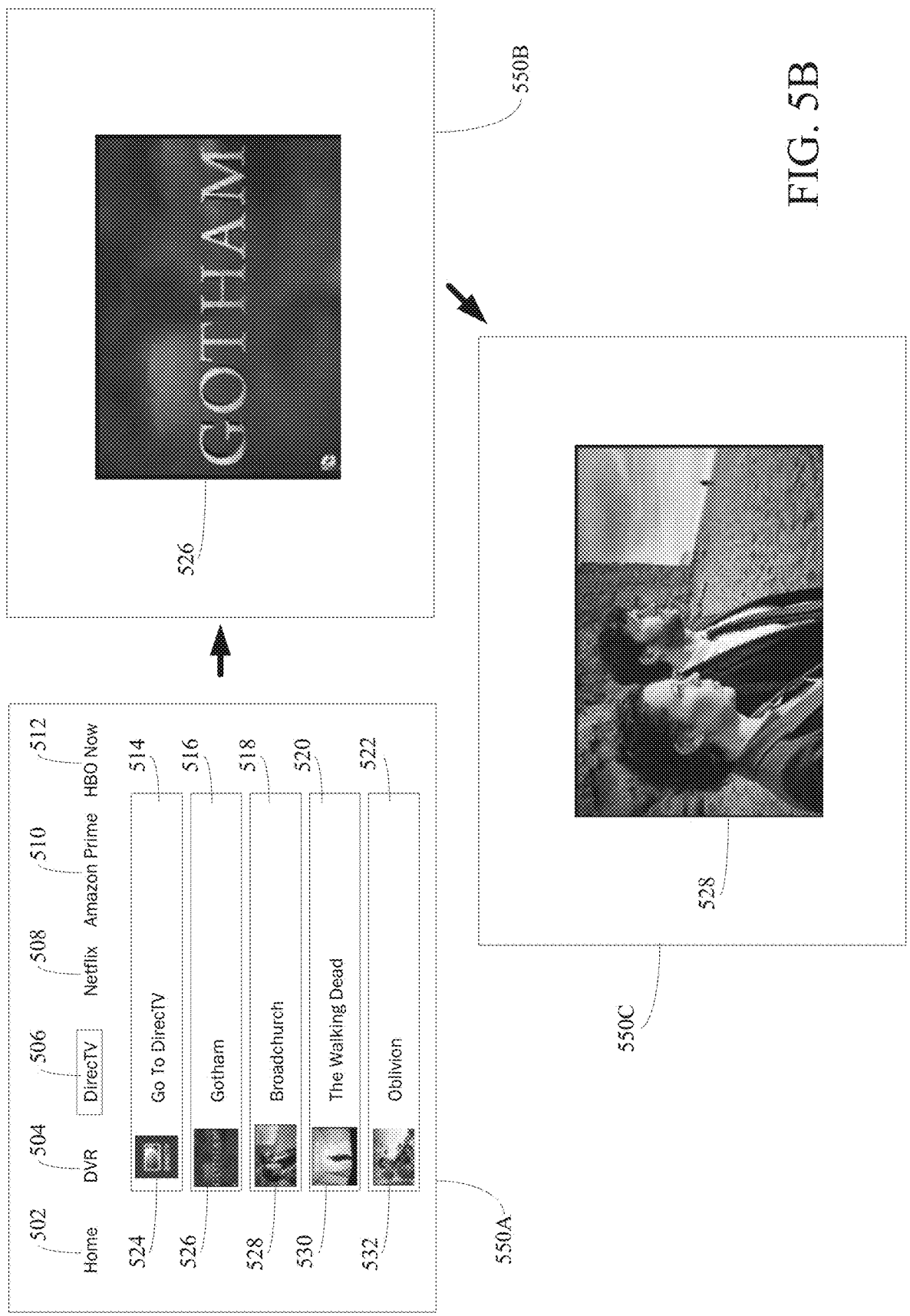

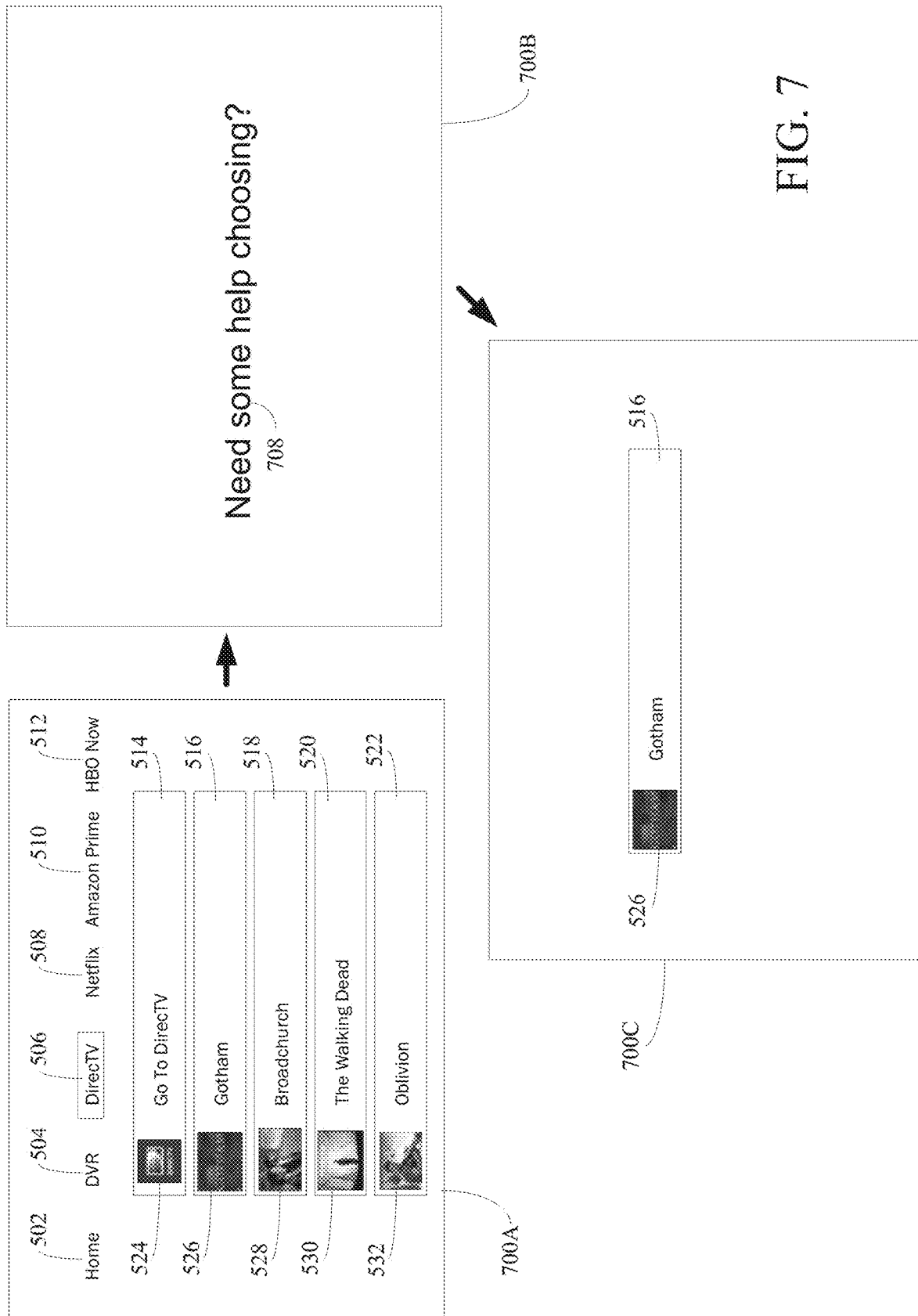

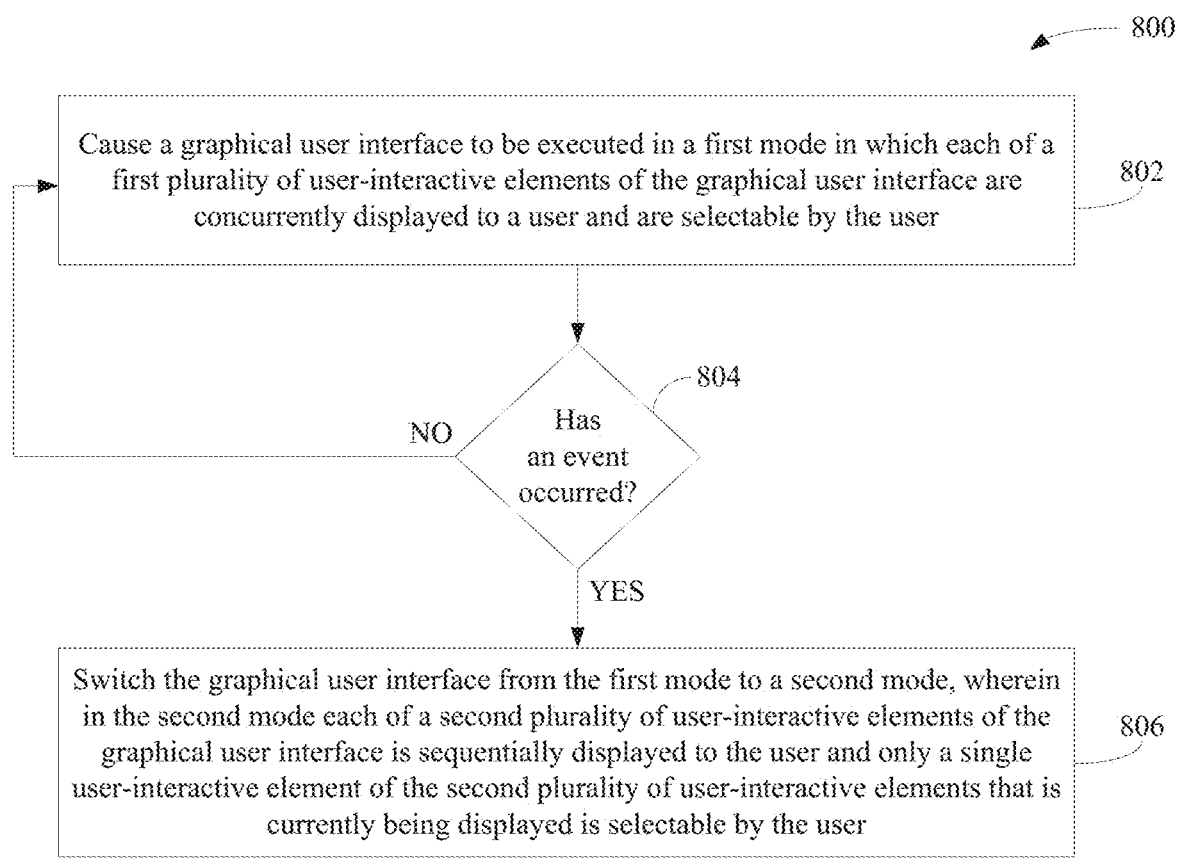

Talk to us. Let us know what you want to watch.
"The walking dead"

SYSTEMS AND METHODS FOR GUIDED USER INTERFACE NAVIGATION

CROSS-REFERENCE TO RELATED APPLICATIONS

This application claims priority to U.S. Provisional Patent Application No. 62/210,113, filed Aug. 26, 2015, the entirety of which is incorporated by reference herein.

This application is also related to the following U.S. patent application, which is incorporated by reference herein:

U.S. patent application Ser. No. 15/248,978, filed on even date herewith and entitled "System and Method for Personalizing and Recommending Content," which claims priority to U.S. Provisional Application No. 62/210,127, filed Aug. 26, 2015, the entirety of which is incorporated by reference.

BACKGROUND

Technical Field

The subject matter described herein relates to graphical user interfaces.

Description of Related Art

Typical user interface systems (e.g., graphical user interfaces (GUIs)) for computers, smart phones, tablets, TV and other devices with display screens employ the use of icons, labels, images, menus, buttons, text descriptions, etc., to indicate a user's state or location, what the user can do, and where the user can navigate to within the user interface system. Some of these elements may be navigational aids or actions a user can take. Some of these elements may be persistent or modal. All these user interface systems support an active user navigation model. Active user navigation models require the user to do all the driving. These elements, whilst helpful for providing context and optionality to a user, can clutter a user interface and make the user interface confusing or difficult to navigate. The user may have too many choices and not know what choice to make or may not want to make a choice at all. However, once a user knows what he or she wants to do or what tasks to perform, these common user interface systems are extremely functional and efficient.

BRIEF SUMMARY

Systems, methods and apparatuses are described for guided user interface navigation, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 5A shows implementation-specific example GUI screens illustrating switching between the first mode of operation and the second mode of operation in accordance with an embodiment.

FIG. 5B shows implementation-specific example GUI screens illustrating switching between the first mode of operation and the second mode of operation in accordance with another embodiment.

FIG. 7 shows implementation-specific example GUI screens illustrating a prompt that is displayed upon the GUI entering the second mode of operation in accordance with an embodiment.

FIG. 8 shows a flowchart of a method for implementing a multimode GUI in accordance with an embodiment.

FIG. 9 shows an example electronic device in accordance with an embodiment.

Figure 1:
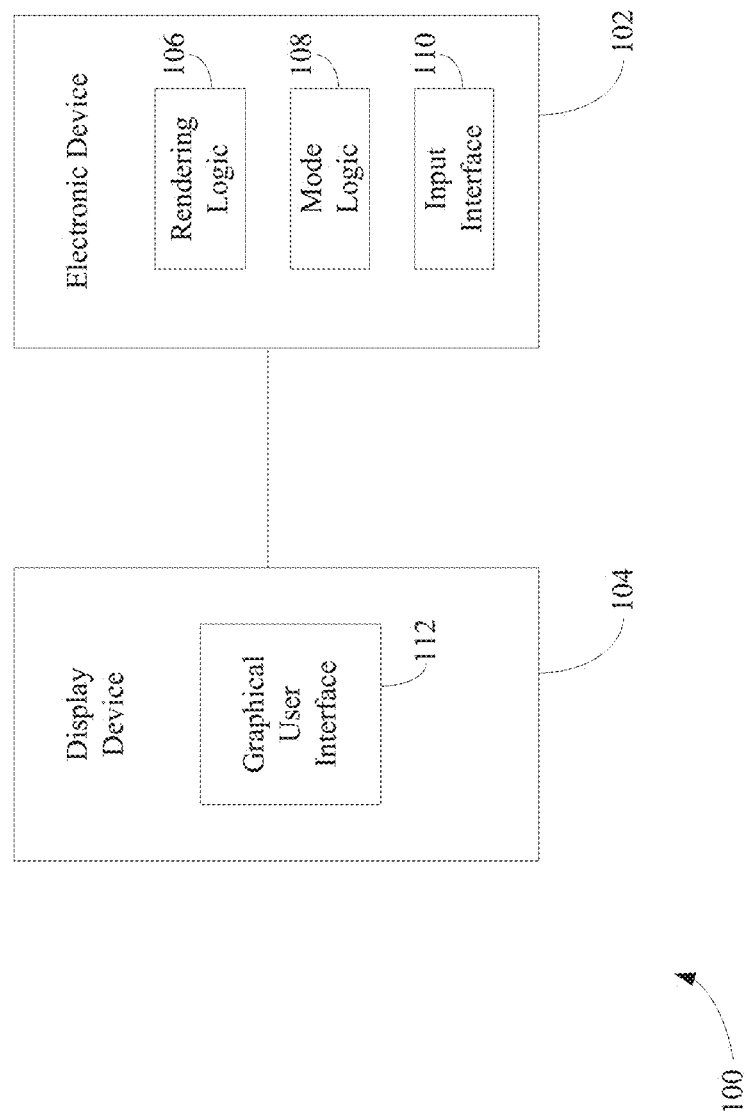
FIG. 1 is a block diagram for a system for implementing a multimode GUI in accordance with an embodiment.

Applicant expressly disclaims any rights to any third-party trademarks or copyrighted images included in the figures. Such marks and images have been included for illustrative purposes only and constitute the sole property of their respective owners.

Embodiments will now be described with reference to the accompanying drawings.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Systems and Methods for Guided User Interface Navigation

Techniques are described herein for a multimode graphical user interface (GUI), where a first mode of operation of the GUI implements an unguided navigation model and a second mode of operation of the GUI implements a guided navigation model in which the GUI is distilled down to only its most critical elements. This may be achieved, for example, by sequentially displaying only a single or only a few user interface elements (e.g., user-interactive elements) and removing all other user interface elements (e.g., user-interactive elements and/or non-user-interactive elements) of the GUI. The second mode of operation of the GUI may lead a user through multiple user interface elements one at a time, thus creating a guided navigation model. The second mode of operation may be initiated upon detecting a certain event (e.g., a period of inactivity, an explicit command from the user, etc.). The multimode GUI may be used to guide a user through one or more recommended items of media content from one or more different content-providing sources.

Techniques described herein advantageously reduce the clutter of GUI elements presented to a user by reducing the number of GUI elements presented to a user, thereby providing a user with a minimal, simplified GUI that automatically navigates a user through a normally cluttered, complex or confusing GUI.

Techniques described herein can improve the functioning of a device (e.g., a computer) on which they are implemented. For example, rendering a large number of user interface elements is generally compute-intensive and results in significant power consumption. By limiting the number of user interface elements that are rendered to a display screen at any given time, the computational efficiency of the device can be improved and less power can be consumed.

Furthermore, because the techniques described herein can help simplify the user experience when interacting with a GUI, such techniques can reduce the number of user input errors made by the user when interacting with the GUI. This in turn can help improve the functioning of the device, which does not need to expend resources processing user requests that have been entered in error.

FIG. 1 is a block diagram of a system 100 for implementing a multimode GUI in accordance with an embodiment. As shown in FIG. 1, system 100 includes an electronic device 102 and a display device 104. Electronic device 102 may be configured to access media content (e.g., pictures, movies, television shows, music, video games, etc.) for viewing or consumption by a user via display device 104. The media content may comprise digital media content. The media content may be stored locally to and/or remotely from electronic device 102. Electronic device 102 may be any type of computing or electronic device that is capable of accessing media content including but not limited to a desktop computer or PC (personal computer), a Blu-ray player, a DVD player, a set-top box, an audio/video receiver (AVR), a mobile computer or mobile computing device (e.g., a Microsoft® Surface® device, a personal digital assistant (PDA), a laptop computer, a notebook computer, a tablet computer such as an Apple® iPad™, a netbook, etc.), a mobile phone (e.g., a cell phone, a smart phone such as a Microsoft Windows® phone, an Apple® iPhone™, a phone implementing the Google® Android™ operating system, a Palm® device, a RIM Blackberry® device, etc.), a wearable computing device (e.g., a smart watch, smart glasses such as Google® Glass™, etc.), or other type of mobile device.

As shown in FIG. 1, electronic device 102 comprises rendering logic 106, mode logic 108 and an input interface 110. Each of these components may be implemented in hardware (e.g., using one or more digital and/or analog circuits), as software (e.g., software or firmware executed by one or more microprocessors or microcontrollers), or as a combination of hardware and software. Rendering logic 106 is configured to cause a GUI 112 to be rendered on display device 104. Display device 104 may be an integrated part of electronic device 102, or may be a standalone display device (as shown in FIG. 1). In an embodiment in which display device 104 is an integrated part of electronic device 102, display device 104 may comprise a display screen of any type, such as an LCD (liquid crystal display) screen, an LED (light emitting diode) screen such as an organic LED screen, a plasma display screen, or other type of display screen. In an embodiment in which display device 104 is a standalone display device, display device 104 may be a television, a monitor, and/or some other device that itself includes a display screen of any type as described above.

Display device 104 may be used to display items of media content that are accessed by electronic device 102. A user of electronic device 102 may interact with GUI 112 to browse items of media content that are accessible by electronic device 102 and/or control various aspects of electronic device 102. GUI 112 may include one or more user-interactive elements and/or non-user-interactive elements, each of which comprises textual and/or image content. GUI 112 is configured to be interacted with by a user via input interface 110. For example, input interface 110 may be configured to receive input from a user that enables the user to navigate GUI 112 to find items of media content to be displayed by display device 104. Input interface 110 may be included in electronic device 102 (as shown in FIG. 1) and/or display device 104. Input interface 110 may be configured to receive user input via wired and/or wireless means. Input interface 110 may be configured to receive user input via a remote control device, a keyboard, a thumb wheel, a pointing device, a roller ball, a stick pointer, a voice recognition system, etc. Input interface 110 may also be configured to receive user input via a touch sensitive display. For example, a display device coupled to electronic device 102 (e.g., display device 104) may comprise a capacitive touch screen configured to receive input from the user.

GUI 112 is a multimode graphical user interface that switches between at least a first mode of operation and a second mode of operation. The first mode of operation may comprise an "unguided" mode, in which a plurality of user-interactive elements is concurrently displayed to the user and are selectable thereby. The second mode of operation may comprise a "guided" mode, in which a user is automatically guided through the GUI one user-interactive element at a time, or only a few user-interactive elements at a time. In accordance with one embodiment, in the second mode of operation, the user-interactive elements are sequentially displayed to the user one at a time, such that only a single user-interactive element is displayed to the user at any given time. In accordance with another embodiment, in the second mode of operation, only a few of the user-interactive elements are displayed to the user at any given time. In this way, the user is able to focus on only the displayed user-interactive element(s). In accordance with yet another embodiment, focus may be provided to certain displayed user-interactive elements(s) in the second mode by enlarging the size and/or increasing the brightness of those user-interactive element(s) and concurrently decreasing the brightness and/or size of other GUI elements (e.g., either user-interactive or non-user interactive elements).

In the second mode of operation, each of the user-interactive elements of GUI 112 that are sequentially displayed may be displayed for a predetermined period of time before another user-interactive element of GUI 112 is displayed. For example, a first user-interactive element may be displayed for a first predetermined time period (e.g., 5 seconds). After expiration of the first predetermined time period, a second user-interactive element may be displayed in lieu of the first user-interactive element for a second predetermined time period, which may or may not be the same as the first predetermined time period. At any time while a user-interactive element is displayed, a user may select the user-interactive element. In accordance with an embodiment, the user-interactive elements that are sequentially displayed comprise content identifiers (e.g., a title that represents or is otherwise associated with an item of media content, an image or icon that represents or is otherwise associated with an item of media content, etc.). In accordance with such an embodiment, selection of a content identifier causes electronic device 102 to retrieve the item of content (or a portion thereof) corresponding to the selected content identifier for playback via display device 104. The content identifiers that are sequentially displayed and/or the order in which they are displayed may be based on a usage profile or usage model for one or more users that is determined based on the viewing habits of the user(s). Additional details regarding how a user profile or usage model is determined may be found in U.S. patent application Ser. No. 15/248,978, filed on even date herewith and entitled "System and Method for Personalizing and Recommending Content," the entirety of which is incorporated by reference.

Mode logic 108 may be configured to switch the mode in which GUI 112 operates based on a determination that a certain event has occurred. In accordance with one example embodiment, the event is a period of inactivity of a user with respect to GUI 112. For example, if the user has not interacted with GUI 112 (e.g., has not provided any input to GUI 112 via input interface 110) for a predetermined period of time, mode logic 108 may send a signal to rendering logic 106. In response to receiving the signal, rendering logic 106 may cause GUI 112 to switch from the first mode of operation to the second mode of operation. In accordance with another example embodiment, the event is a determination that the user has provided a certain predefined input via input interface 110. The predefined input may comprise, for example, an interaction with a certain user-interactive element currently being displayed on GUI 112, or an interaction with an interactive element (e.g., a button) of electronic device 102, display device 104, or a remote control device (not shown) that is configured to control electronic device 102 and/or display device 104. In response to receiving the predefined input, mode logic 108 may send a signal to rendering logic 106. In response to receiving the signal, rendering logic 106 may cause GUI 112 to switch from the first mode of operation to the second mode of operation.

When in the second mode operation, GUI 112 may display one or more user-interactive elements (e.g., a button, such as a "Back" button and/or an "Exit" button) that, when activated, cause GUI 112 to switch back to the first mode of operation and display a particular GUI screen. For example, upon activation of a first user-interactive element (e.g., an "Exit" button), mode logic 108 may send a first signal to rendering logic 106. In response to receiving the first signal, rendering logic 106 may cause GUI 112 to switch back to the first mode of operation and display an initial screen (e.g., a "Home" or startup screen) of GUI 112. Upon activation of a second user-interactive element (e.g., a "Back" button), mode logic 108 may send a second signal to rendering logic 106. In response to receiving the second signal, rendering logic 106 may cause GUI 112 to switch back to the first mode of operation and display the last GUI screen displayed to the user before GUI 112 was switched to the second mode of operation. In addition to or in lieu of displaying such user-interactive elements, electronic device 102, display device 104, and/or a remote control device configured to control electronic device 102 and/or display device 104 may include interactive elements that, when activated, provide similar functionality as described above with respect to the first and second user-interactive elements.

In accordance with an embodiment, upon switching to the second mode of operation (and before sequentially displaying user-interactive elements), GUI 112 may display one or more prompts (e.g., a messages) to indicate that a switch to the second mode of operation is occurring.

Figure 2:
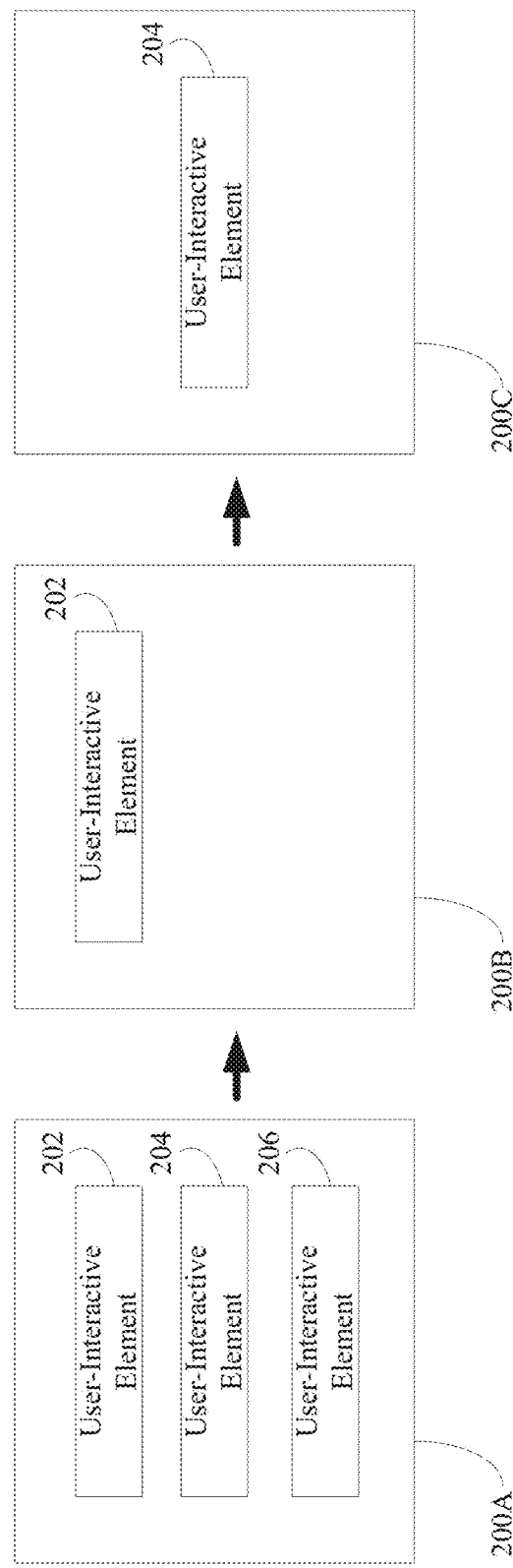
FIG. 2 shows example GUI screens illustrating a transition between a first mode of operation and a second mode of operation of a GUI in accordance with an embodiment.
Figure 3:
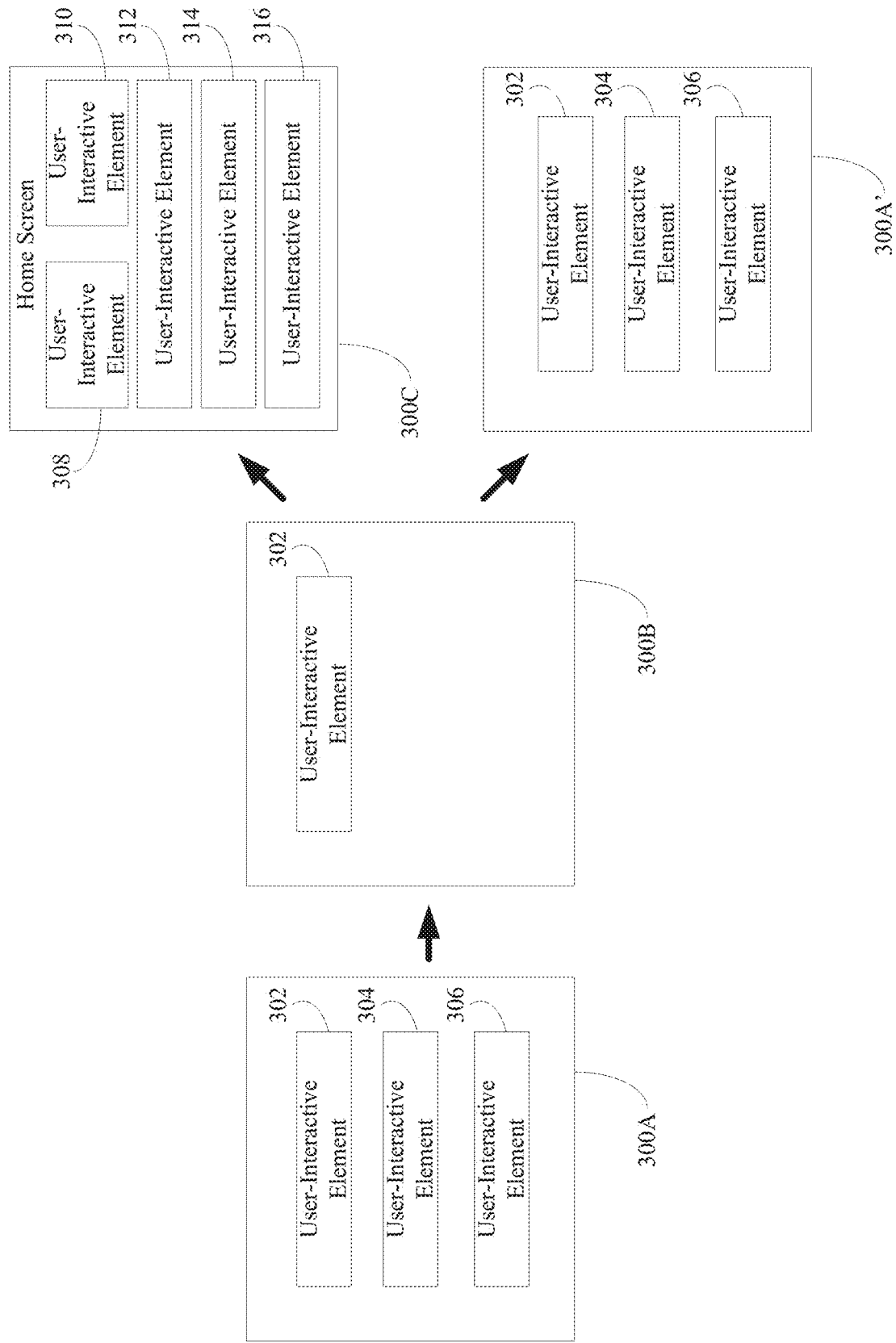
FIG. 3 shows example GUI screens illustrating switching from the first mode of operation to the second mode of operation, and then back to the first mode of operation in accordance with an embodiment.
Figure 4:
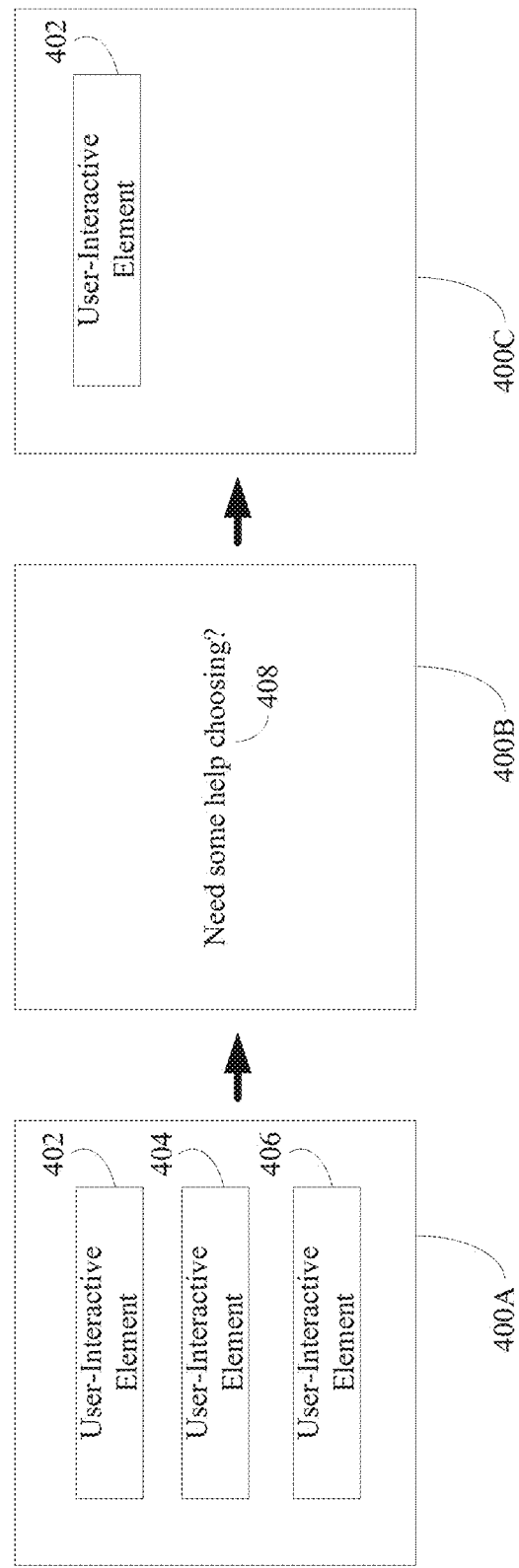
FIG. 4 shows example GUI screens illustrating a prompt that is displayed upon the GUI entering the second mode of operation in accordance with an embodiment.

FIGS. 2-4 show example GUI screens that illustrate examples of the first mode of operation, the second mode of operation, and transitions therebetween for GUI 112 in accordance with an embodiment. FIGS. 2-4 will be described with continued reference to FIG. 1.

FIG. 2 shows example GUI screens 200A, 200B, and 200C in accordance with an embodiment. GUI screen 200A illustrates GUI 112 when GUI 112 is operating in the first mode of operation, and GUI screens 200B and 200C illustrate GUI 112 when GUI 112 is operating in the second mode of operation. As shown in GUI screen 200A, a plurality of user-interactive elements 202, 204 and 206 are concurrently displayed to the user. Upon determining that an event has occurred, mode logic 108 sends a signal to rendering logic 106. In response to receiving the signal, rendering logic 106 causes GUI 112 to switch to the second mode operation, as shown in GUI screen 200B.

As shown in GUI screen 200B, only a single user-interactive element (i.e., user-interactive element 202) is displayed to the user and all other user-interactive elements (i.e., user-interactive elements 204 and 206) are no longer displayed to the user. For example, during this stage of the second mode of operation, rendering logic 106 renders only user-interactive element 202 and does not render user-interactive elements 204 and 206. As shown in GUI screen 200B, user-interactive element 202 is displayed in the same position as it was displayed in the first mode of operation. However, user-interactive element 202 may be displayed in any location upon GUI 112 entering the second mode of operation. Moreover, user-interactive element 202 (or a portion thereof) may be enlarged and/or brightened.

After a predetermined period of time of user inactivity, user-interactive element 202 is replaced by another user-interactive element. For example, as shown in GUI screen 200C, user-interactive element 204 is displayed to the user, and all other user-interactive elements (i.e., user-interactive elements 202 and 206) are not displayed to the user. For example, during this stage of the second mode of operation, rendering logic 106 renders only user-interactive element 204 and does not render user-interactive elements 202 and 206. As shown in GUI screen 200C, user-interactive element 204 is displayed in the same position as it was displayed in the first mode of operation. However, user-interactive element 204 may be displayed in any location upon GUI 112 entering the second mode of operation. Moreover, user-interactive element 204 (or a portion thereof) may be enlarged and/or brightened.

FIG. 3 shows example GUI screens illustrating GUI 112 switching from the first mode of operation to the second mode of operation, and then back to the first mode of operation in accordance with an embodiment. For example, GUI screen 300A illustrates GUI 112 when GUI 112 is in the first mode of operation, GUI screen 300B illustrates GUI 112 when GUI 112 is in the second mode of operation, and GUI screens 300C and 300A' illustrate GUI 112 when GUI 116 switches back to the first mode of operation. As shown in GUI screen 300A, a plurality of user-interactive elements 302, 304 and 306 are concurrently displayed to the user. Upon determination that an event has occurred, mode logic 108 sends a signal to rendering logic 106. In response to receiving the signal, rendering logic 106 causes GUI 112 to switch to the second mode of operation, as shown in GUI screen 300B.

As shown in GUI screen 300B, only a single user-interactive element (i.e., user-interactive element 302) is displayed to the user and all other user-interactive elements (i.e., user-interactive elements 304 and 306) are no longer displayed to the user. For example, during this stage of the second mode of operation, rendering logic 106 renders only user-interactive element 302 and does not render user-interactive elements 304 and 306. As shown in GUI screen 300B, user-interactive element 302 is displayed in the same position as it was displayed in the first mode of operation. However, user-interactive element 302 may be displayed in any location upon GUI 112 entering the second mode of operation. Moreover, user-interactive element 302 (or a portion thereof) may be enlarged and/or brightened.

Upon determining that a user has interacted with a first interface element (e.g., a "Back" button of a remote control device), mode logic 108 sends a signal to rendering logic 106, which causes rendering logic 106 to switch GUI 112 to the first mode of operation and render the last GUI screen displayed to the user before GUI 112 was switched to the second mode of operation (i.e., GUI screen 300A'). As shown in FIG. 3, GUI screen 300A' is identical to GUI screen 300A, which was the last screen displayed to the user before GUI 112 was switched to the second mode of operation.

Alternatively, upon determining that a user has interacted with a second interface element (e.g., an "Exit" button of a remote control device), mode logic 108 sends a signal to rendering logic 106, which causes rendering logic 106 to switch GUI 112 to the first mode operating mode and render a "Home Screen" 300C of the first mode of operation. As shown in FIG. 3, "Home Screen" 300C may comprise a different number, type and/or arrangement of user-interface elements (e.g., user-interactive elements 308, 310, 312, 314 and 316) as compared to GUI screen 300A. Each of user-interactive elements 308, 310, 312, 314 and 316 may be of the same as any of user-interactive elements 302, 304, and 306 or may be a user-interactive element not displayed on GUI screen 300A.

FIG. 4 shows example GUI screens illustrating a prompt that is displayed upon GUI 112 entering the second mode of operation in accordance with an embodiment. As shown in GUI screen 400A, a plurality of user-interactive elements 402, 404 and 406 are concurrently displayed to the user while GUI 112 is operating in the first mode of operation. Upon determining that an event has occurred, mode logic 108 sends a signal to rendering logic 106, which causes rendering logic 106 to switch GUI 112 to the second mode of operation and render a prompt to the user. For example, as shown in FIG. 4, GUI screen 400B comprises a prompt 408 ("Need some help choosing?"), which indicates to the user that GUI 112 has entered the second mode of operation and that certain user-interactive elements are going to be sequentially displayed to the user. Prompt 408 may be displayed for a predetermined period of time or until an event is detected (e.g., a user interaction with GUI 112 or an interactive element of electronic device 102, display device 104, or a remote control device). Upon expiration of the predetermined period of time or the detection of the event, rendering logic 106 no longer renders prompt 408 and begins to sequentially display user-interactive elements 402, 404 and 406.

For example, as shown in FIG. 400C, only a single user-interactive element (i.e., user-interactive element 402) is displayed to the user and all other user-interactive elements (i.e., user-interactive elements 404 and 406) are not displayed to the user. For example, during this stage of the second mode of operation, rendering logic 106 renders only user-interactive element 402 and does not render user-interactive elements 404 and 406. As shown in GUI screen 400C, user-interactive element 402 is displayed in the same position as it was displayed in the first mode of operation. However, user-interactive element 402 may be displayed in any location upon GUI 112 entering the second mode of operation. Moreover, user-interactive element 402 (or a portion thereof) may be enlarged and/or brightened.

As described above with reference to FIGS. 2-4, the same user-interactive elements that are displayed in the first mode of operation are displayed in the second mode of operation. However, embodiments described herein are not so limited. For example, upon GUI 112 entering the second mode of operation, GUI 112 may display one or more user-interface elements that were not displayed in the first mode of operation.

FIGS. 5A, 5B, 6 and 7 show implementation-specific example GUI screens that illustrate examples of the first mode of operation, the second mode of operation, and transitions therebetween for GUI 112 in which GUI 112 is used to browse for media content from a plurality of content-providing sources in accordance with an embodiment. FIGS. 5A, 5B, 6 and 7 will be described with continued reference to FIG. 1. It is noted that while the implementation-specific example GUI screens shown in FIGS. 5A, 5B, 6 and 7 depict an embodiment in which GUI 112 is used to browse for media content, the embodiments described herein are not so limited.

FIG. 5A shows example GUI screens 500A, 500B, and 500C. GUI screen 500A illustrates GUI 112 when GUI 112 is in the first mode of operation, and GUI screens 500B and 500C illustrate GUI 112 when GUI 112 is in the second mode of operation. As shown in GUI screen 500A, a plurality of user-interactive elements 502, 504, 506, 508, 510, 512, 514, 516, 518, 520 and 522 are concurrently displayed to the user. User-interactive element 502, when selected, causes GUI 112 to display an initial or "Home" screen of GUI 112 when GUI 112 is in the first mode of operation. Each of user-interactive elements 504, 506, 508, 510 and 512 may be content source identifiers that are used to identify content accessible via a content-providing source corresponding to the selected content source identifier. For example, user-interactive element 504, when activated, causes GUI 112 to display one or more content identifiers for items of media content that are accessible via a first content-providing source (e.g., a digital video recorder ("DVR")) coupled to at least one of electronic device 102 and/or display device 104. User-interactive element 506, when activated, causes GUI 112 to display content identifier(s) for items of media content that are accessible via a second content-providing source (e.g., "DirecTV") coupled to at least one of electronic device 102 and/or display device 104. User-interactive element 508, when activated, causes GUI 112 to display content identifier(s) for items of media content that are accessible via a third content-providing source (e.g., "Netflix™") coupled to at least one of electronic device 102 and/or display device 104. User-interactive element 510, when activated, causes GUI 112 to display content identifier(s) for items of media content that are accessible via a fourth content-providing source (e.g., "Amazon Prime™") coupled to at least one of electronic device 102 and/or display device 104. User-interactive element 512, when activated, causes GUI 112 to display content identifier(s) for items of media content that are accessible via a fifth content-providing source (e.g., "HBO Now") coupled to at least one of electronic device 102 and/or display device 104.

As shown in GUI Screen 500A, the "DirecTV™" content source identifier (i.e., user-interactive element 506) is selected. As a result, user-interactive elements 514, 516, 518, 520 and 522, which are associated with the "DirecTV™" service, are displayed to the user. User-interactive element 514, when activated, causes a GUI (e.g., a program guide) associated with the "DirecTV™" service to be displayed to the user. Other user-interactive elements (e.g., user-interactive elements 516, 518, 520 and 522) may display content identifiers corresponding to items of media content accessible via the "DirecTV™" service. Upon activation of any of user-interactive elements 516, 518, 520 and 522, an item of media content corresponding to the content identifier associated therewith is played back using the "DirecTV™" service. For example, activation of user-interactive element 516 by a user causes media content "Gotham" to be played back using the "DirecTV™" service. Activation of user-interactive element 518 by a user causes media content "Broadchurch" to be played back using the "DirecTV™" service. Activation of user-interactive element 520 by a user causes media content "The Walking Dead" to be played back using the "DirecTV™" service. Activation of user-interactive element 522 by a user causes media content "Oblivion" to be played back using the "DirecTV™" service.

Each of user-interactive elements 514, 516, 518, 520 and 522 may comprise a thumbnail representation of the item of content and/or content-providing source associated with the user-interactive element. For example, user-interactive element 514 comprises a first thumbnail image 524 representing the "DirecTV™" service, user-interactive element 516 comprises a second thumbnail image 526 representing the media content "Gotham", user-interactive element 518 comprises a third thumbnail image 528 representing the media content "Broadchurch", user-interactive element 520 comprises a fourth thumbnail image 560 representing the media content "The Walking Dead" and user-interactive element 522 comprises fifth thumbnail image 532 representing the media content "Oblivion".

After detection of a certain event (e.g., detection of a period of user inactivity of a user with respect to GUI 112), mode logic 108 sends a signal to rendering logic 106, which causes GUI 112 to switch to the second mode of operation, as shown in GUI screen 500B. As shown in GUI screen 500B, only a single user-interactive element (i.e., user-interactive element 516) is displayed to the user and all other user-interactive elements (i.e., user-interactive elements 502, 504, 506, 508, 510, 512, 514, 518, 520 and 522) are no longer displayed to the user. For example, during this stage of the second mode of operation, rendering logic 106 renders only user-interactive element 516 and does not render user-interactive elements 502, 504, 506, 508, 510, 512, 514, 518, 520 and 522. As shown in GUI screen 500B, user-interactive element 516 is displayed in the same position as it was displayed in the first mode of operation. However, user-interactive element 516 may be displayed in any location upon GUI 112 entering the second mode of operation.

Moreover, user-interactive element 516 (or a portion thereof) may be enlarged and/or brightened. For example, as shown in GUI screen 550B of FIG. 5B, a user-interactive version of thumbnail representation 526 (as described above with reference to GUI screen 500A as shown in both FIG. 5A and FIG. 5B) may be enlarged and displayed to the user instead of user-interactive element 516.

After a predetermined period of time of user inactivity, user-interactive element 516 is replaced by another user-interactive element. For example, as shown in GUI screen 500C, user-interactive element 518 is displayed to the user, and all other user-interactive elements (i.e., user-interactive elements 502, 504, 506, 508, 510, 512, 514, 516, 520 and 522) are not displayed to the user. For example, during this stage of the second mode, rendering logic 106 renders only user-interactive element 518 and does not render user-interactive elements 502, 504, 506, 508, 510, 512, 514, 516, 520 and 522. As shown in GUI screen 500C, user-interactive element 518 is displayed in the same position as it was displayed in the first mode of operation. However, user-interactive element 518 may be displayed in any location upon GUI 112 entering the second mode of operation.

Moreover, user-interactive element 518 (or a portion thereof) may be enlarged and/or brightened. For example, as shown in GUI screen 550C of FIG. 5B, a user-interactive version of thumbnail representation 528 may be enlarged and displayed to the user instead of user-interactive element 518.

Figure 6:
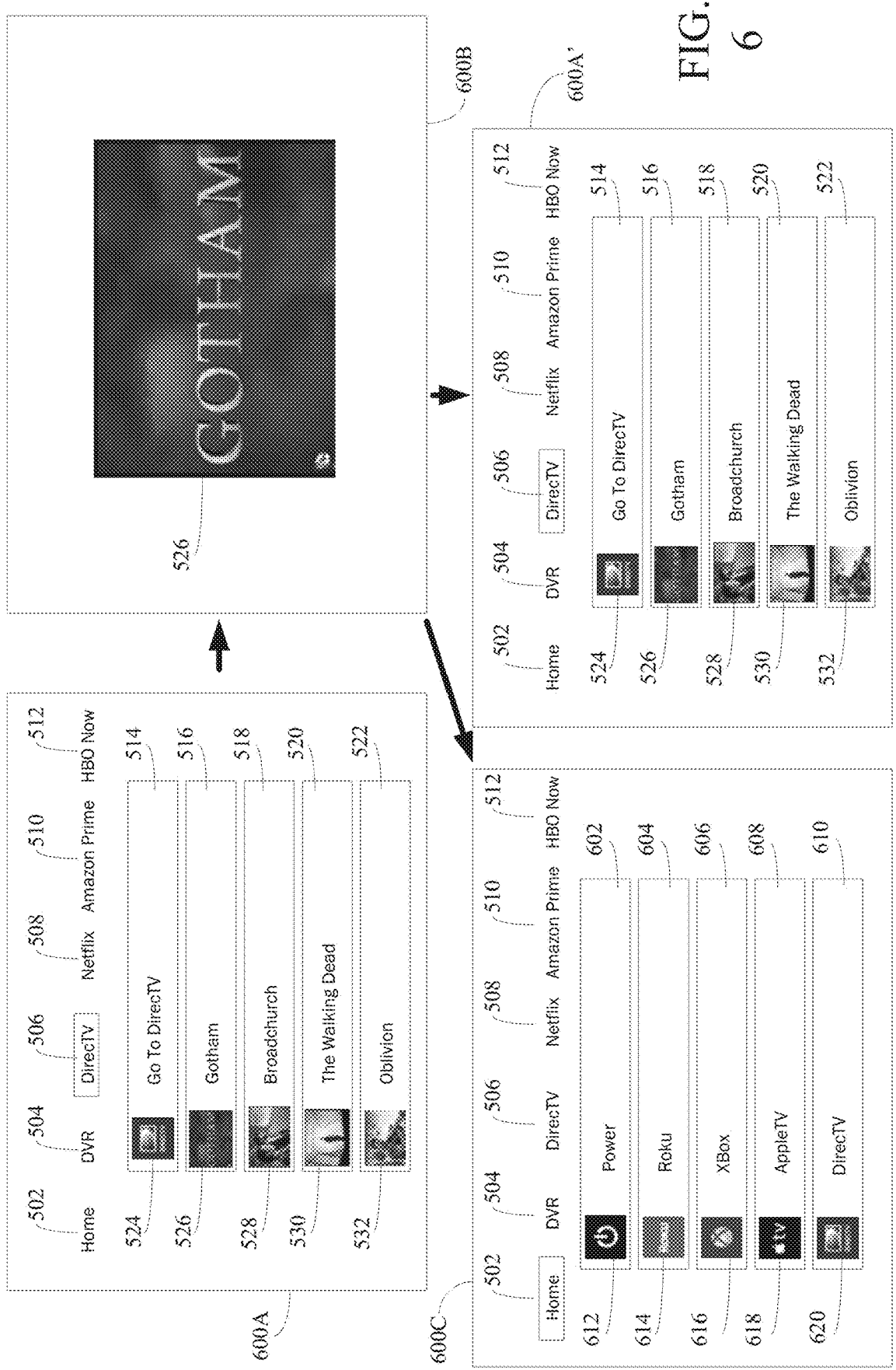
FIG. 6 shows implementation-specific example GUI screens illustrating switching from the first mode of operation to the second mode of operation, and then back to the first mode of operation in accordance with an embodiment.

FIG. 6 shows example implementation-specific GUI screens illustrating GUI 112 switching from the first mode of operation to the second mode of operation, and then back to the first mode of operation. For example, GUI screen 600A illustrates GUI 112 when GUI 112 is in the first mode of operation, GUI screen 600B illustrates GUI 112 when GUI 112 is in the second mode of operation, and GUI screens 600C and 600A' illustrate GUI 112 when GUI 116 switches back to the first mode of operation. GUI screen 600A is an example of GUI screen 500A and 550A (as respectively shown in FIGS. 5A and 5B) and will not be described herein for the sake of brevity.

Upon determining that an event has occurred, mode logic 108 causes GUI 112 to switch to the second mode of operation, as shown in GUI screen 600B. GUI screen 600B is an example of GUI screen 550B, as described above with reference to FIG. 5B. Accordingly, in GUI screen 600B, only a thumbnail representation 526 of user-interactive element 516 is displayed, and all other user-interactive elements (i.e., user-interactive elements 502, 504, 506, 508, 510, 512, 514, 518, 520 and 522) are no longer displayed to the user.

Upon determining that a user has interacted with a first interface element (e.g., a "Back" button of a remote control device), mode logic 108 sends a signal to rendering logic 106, which causes rendering logic 106 to switch GUI 112 to the first mode of operation and render the last GUI screen displayed to the user before GUI 112 was switched to the second mode of operation (i.e., GUI screen 600A'). As shown in FIG. 6, GUI screen 600A' is identical to GUI screen 600A, which was the last screen displayed to the user before GUI 112 was switched to the second mode of operation.

Alternatively, upon determining that a user has interacted with a second interface element (e.g., an "Exit" button of a remote control device), mode logic 108 sends a signal to rendering logic 106, which causes rendering logic 106 to switch GUI 112 to the first mode of operation and render a "Home Screen" 600C. As shown in FIG. 6, "Home Screen" 600C may display a plurality of user-interactive elements 502, 504, 506, 508, 510, 512, 602, 604, 606, 608 and 610.

As shown in GUI screen 600C, user-interactive element 502 is selected, thereby indicating that the "Home" screen is displayed to the user. User-interactive element 602 is a "Power" button, which, when activated, causes electronic device 102 and/or display device 104 to be powered off. Each of user-interactive elements 604, 606, 608 and 610 may be content source identifiers that are used to access content originating from a content-providing source corresponding to the selected content source identifier. For example, activation of user-interactive element 604 by a user causes GUI 112 to display content identifier(s) for items of media content that are accessible via a first content-providing source (e.g., a "Roku" device) coupled to at least one of electronic device 102 and/or display device 104. Activation of user-interactive element 606 by a user causes GUI 112 to display content identifier(s) for items of media content that are accessible via a second content-providing source (e.g., an "Xbox™" device) coupled to at least one of electronic device 102 and/or display device 104. Activation of user-interactive element 608 by a user causes GUI 112 to display content identifier(s) for items of media content that are accessible via a third content-providing source (e.g., an "AppleTV™" device) coupled to at least one of electronic device 102 and/or display device 104. Activation of user-interactive element 610 by a user causes GUI 112 to display content identifier(s) for items of media content that are accessible via a fourth content-providing source (e.g., "DirecTV") coupled to at least one of electronic device 102 and/or display device 104 (e.g., GUI screen 600A is displayed to the user upon activating user-interactive element 610).

Each of user-interactive elements 602, 604, 606, 608 and 610 may comprise a thumbnail representation associated therewith. For example, user-interactive element 602 comprises a first thumbnail image 612 representative of the power-off functionality provided by user-interactive element 602, user-interactive element 604 comprises a second thumbnail image 614 representative of the content-providing source identified by user-interactive element 604, user-interactive element 606 comprises a third thumbnail image 616 representative of the content-providing source identified by user-interactive element 606, user-interactive element 608 comprises a fourth thumbnail image 618 representative of the content-providing source identified by user-interactive element 608, and user-interactive element 610 comprises a fifth thumbnail image 620 representative of the content-providing source identified by user-interactive element 610.

FIG. 7 shows example GUI screens illustrating a prompt that is displayed upon GUI 112 entering the second mode of operation in accordance with an embodiment. As shown in GUI screen 700A, a plurality of user-interactive elements 502, 504, 506, 508, 510, 512, 514, 516, 518, 520 and 522 are concurrently displayed to the user. GUI screen 700A is an example of GUI screen 500A and 600A (as respectively shown in FIGS. 5 and 6) and is not described here for the sake of brevity. Upon determining that an event has occurred, mode logic 108 causes GUI 112 to switch to the second mode of operation and render a prompt to the user. For example, as shown in FIG. 7, GUI screen 700B comprises a prompt 708 ("Need some help choosing?"), which indicates to the user that GUI 112 has entered the second mode of operation and that certain user-interactive elements are going to be sequentially displayed to the user. Prompt 708 may be displayed for a predetermined period of time or until an event is detected (e.g., a user interaction with GUI 112 or an interactive element of electronic device 102, display device 104, or a remote control device). Upon expiration of the predetermined period of time or detection of the event, rendering logic 106 no longer renders prompt 708 and begins to sequentially display user-interactive elements 516, 518, 520 and 522.

For example, as shown in GUI screen 700C of FIG. 7, the sequential display of user-interactive elements 516, 518, 520 and 522 begins with the display of user-interactive element 516. As shown in GUI screen 700C, only a single user-interactive element (i.e., user-interactive element 516) is displayed to the user and all other user-interactive elements (i.e., user-interactive elements 502, 504, 506, 508, 510, 512, 514, 518, 520 and 522) are not displayed to the user. For instance, rendering logic 106 renders only user-interactive element 516 and does not render user-interactive elements 502, 504, 506, 508, 510, 512, 514, 518, 520 and 522.

As described above with reference to FIGS. 5A, 5B, 6 and 7, certain user-interactive elements that are displayed in the first mode of operation are also displayed in the second mode of operation. However, embodiments described herein are not so limited. For example, upon GUI 112 entering the second mode of operation, GUI 112 may display one or more user-interactive elements that were not displayed in the first mode of operation.

Accordingly, in embodiments, a multimode GUI may be implemented in many ways. For instance, FIG. 8 depicts a flowchart 800 of a method for implementing a multimode GUI in accordance with an embodiment. The method of flowchart 800 may be implemented, for example, by an electronic device 902 shown in FIG. 9. FIG. 9 is a block diagram of electronic device 902 in accordance with an embodiment. Electronic device 902 may be an example of electronic device 102, as described above with reference to FIG. 1. As shown in FIG. 9, electronic device 902 includes rendering logic 906, mode logic 908 and an input interface 910. Rendering logic 906, mode logic 908 and input interface 910 are examples of rendering logic 106, mode logic 108 and an input interface 110, as shown in FIG. 1. As shown in FIG. 9, mode logic 908 includes a timer 912 and event determination logic 914. Other structural and operational embodiments will be apparent to persons skilled in the relevant art(s) based on the following discussion regarding flowchart 800 and electronic device 902.

Flowchart 800 begins with step 802. At step 802, a GUI is caused to be executed in a first mode of operation in which each of a first plurality of user-interactive elements of the GUI are concurrently displayed to a user and are selectable by the user. For example, with reference to FIG. 9, mode logic 908 may cause rendering logic 906 to execute and render the GUI in the first mode of operation on a display device (e.g., display device 104, as shown in FIG. 1).

At step 804, a determination is made as to whether an event has occurred. If an event has occurred, flow continues to step 806. Otherwise, flow returns to step 802. For example, with reference to FIG. 9, event determination logic 914 determines whether an event has occurred. In accordance with an embodiment, the event comprises a determination that the GUI has not received input from the user for a predetermined period of time. For example, with reference to FIG. 9, timer 912 may keep track of the amount of time that has occurred since input interface 910 received input from the user. If the amount of time reaches the predetermined period of time, timer may provide a signal to event determination logic 914. Upon receiving the signal, event determination logic 914 sends a first signal 916 to rendering logic 906. In accordance with another embodiment, the event is a determination that the user has provided a predefined input that indicates that the switch to the second mode of operation should be initiated. For example, with reference to FIG. 9, input interface 910 may detect that the user has provided a predefined input that indicates that the GUI should be switched to the second mode of operation. For example, the user may activate a user-interactive element of the GUI, an interface element of a remote control device used to control the GUI, etc., which causes input interface 910 to send a signal to event determination logic 914. Upon receiving the signal, event determination logic 914 sends a second signal 918 to rendering logic 906.

At step 806, the GUI is switched from the first mode of operation to a second mode of operation. In the second mode of operation, each of a second plurality of user-interactive elements of the GUI is sequentially displayed to the user and only a single user-interactive element of the second plurality of user-interactive elements that is currently being displayed is selectable by the user. For example, with reference to FIG. 9, upon receiving either first signal 916 or second signal 918, rendering logic 806 may execute and render the GUI in the second mode of operation on a display device (e.g., display device 104, as shown in FIG. 1).

In accordance with one or more embodiments, each of the second plurality of user-interactive elements of the GUI that is sequentially displayed to the user is an enlarged version of a corresponding user-interactive element of the first plurality of user-interactive elements. For example, with reference to FIG. 9, rendering logic 906 may sequentially display an enlarged version of a corresponding user-interactive element of the first plurality of user-interactive elements.

In accordance with one or more embodiments, one or more prompts are displayed to the user via the GUI before any of the second plurality of user-interactive elements of the GUI is sequentially displayed to the user. For example, with reference to FIG. 9, rendering logic 906 may display prompt(s) via the GUI before any of the second plurality of user-interactive elements of the GUI is sequentially displayed to the user.

In accordance with one or more embodiments, the first plurality of user-interactive elements are the same as the second plurality of user-interactive elements.

In accordance with one or more embodiments, the first plurality of user-interactive elements and the second plurality of user-interactive elements are user-interactive content identifiers.

Figure 10:
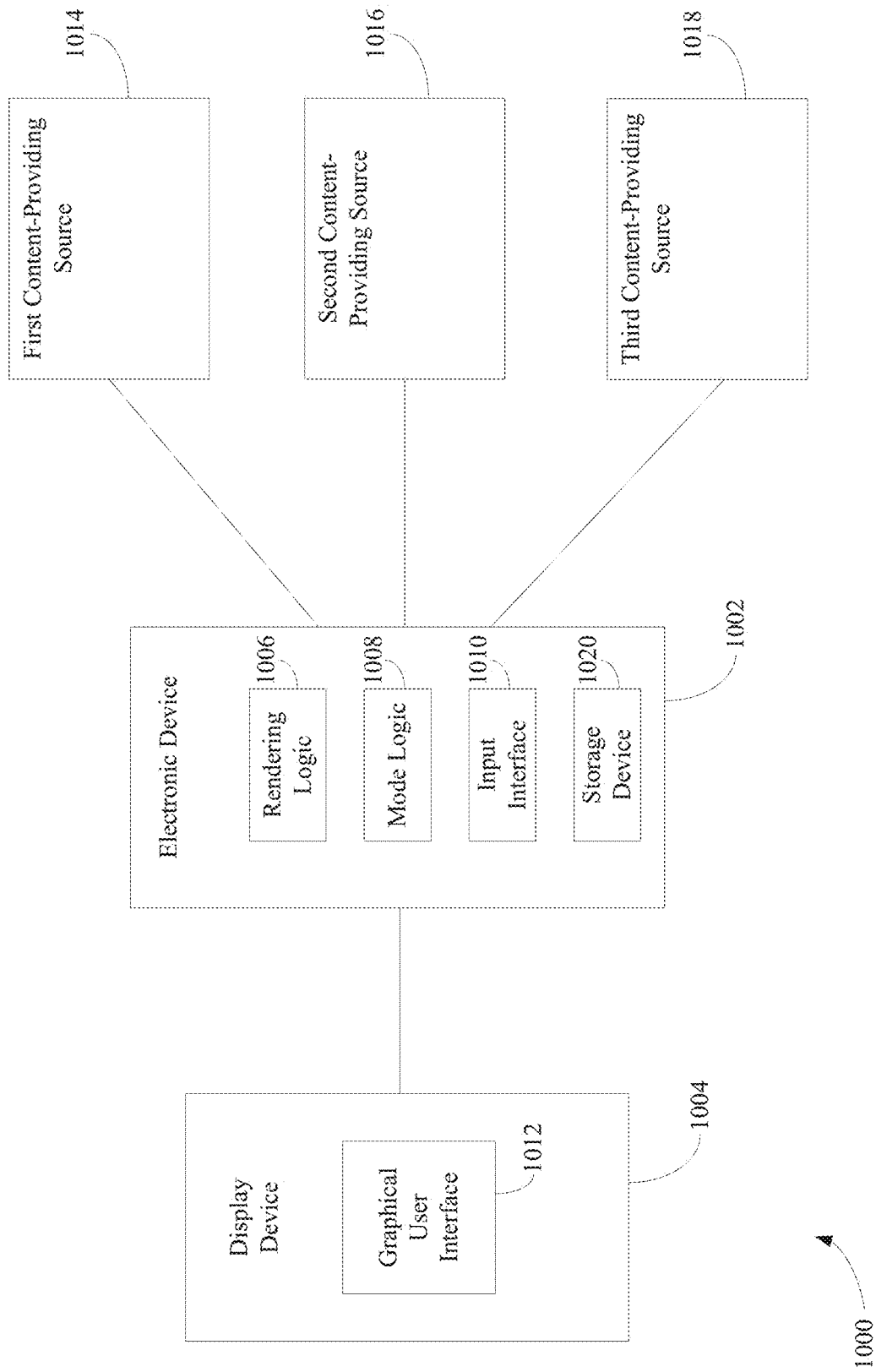
FIG. 10 is a block diagram of a system for automatically recommending content from a plurality of different content-providing sources to a user in accordance with an embodiment.

FIG. 10 is a block diagram of a system 1000 for automatically recommending content from a plurality of different content-providing sources to a user in accordance with an embodiment. As shown in FIG. 10, system 1000 includes an electronic device 1002, a display device 1004, a first content-providing source 1014, a second content-providing source 1016 and a third content-providing source 1018. It is noted that while FIG. 10 shows that electronic device 1002 is coupled to three content-providing sources (i.e., first content-providing source 1014, second content-providing source 1016 and third content-providing source 1018), electronic device 1002 may be coupled to any number of content-providing sources.

Electronic device 1002 may be an example of electronic device 102 as described above with reference to FIG. 1. Accordingly, electronic device 1002 may be configured to access media content (e.g., pictures, movies, television shows, music, video games, etc.) for viewing or consumption by a user via display device 1004. The media content may be stored locally to electronic device 1002 (e.g., in storage device 1020) and/or externally to electronic device 1002 (e.g., on first content-providing source 1014, second content-providing source 1016 and/or third content providing source 1018).

Storage device 1020 may be a random access memory (RAM), a hard disk drive, a solid state drive and/or the like. Each of first content-providing source 1014, second content-providing source 1016 and/or third content providing source 1018 may be a content-providing service (a satellite TV service, such as DirecTV™, cable TV service, or an Internet streaming service, such as Netflix™, Hulu™, HBO Now™, YouTube™, Amazon Prime™, etc) and/or a device (e.g., a server, a set-top box, an Internet streaming device, etc.) configured to provide such services.

As shown in FIG. 10, electronic device 1002 comprises rendering logic 1006, mode logic 1008 and an input interface 1010. Rendering logic 1006 is configured to render a GUI (i.e., GUI 1012) on display device 1004. Display device 1004 may be an example of display device 104, as described above with reference to FIG. 1. Display device 1004 may be used to display media content accessible via electronic device 1002. A user of electronic device 1002 may interact with GUI 1012 to browse content accessible by electronic device 1002 and/or control various aspects of electronic device 1002. GUI 1012 may include one or more user-interactive elements and/or non-user-interactive elements, each of which comprises textual and/or image content. GUI 1012 is configured to be interacted with by a user of electronic device 1002 and/or display device 1004 via input interface 1010. For example, input interface 1010 may be configured to receive input from a user that enables the user to navigate GUI 112 to find media content accessible via storage device 1020, first content-providing source 1014, second content-providing source 1016 and/or third content-providing source 1018. Input interface 1010 may be included in electronic device 1002 (as shown in FIG. 1) and/or display device 1004. Input interface 1010 may be configured to receive user input via wired and/or wireless means. Input interface 1010 may be configured to receive user input via a remote control device, a keyboard, a thumb wheel, a pointing device, a roller ball, a stick pointer, a voice recognition system, etc. Input interface 1010 may also be configured to receive user input via a touch sensitive display. For example, a display device coupled to electronic device 1002 (e.g., display device 1004) may comprise a capacitive touch screen configured to receive input from the user.

GUI 1012 is an example of GUI 112 as described above with reference to FIGS. 1-9. As described above, GUI 1012 is a multimode GUI that switches between at least a first mode of operation and a second mode of operation. Mode logic 1008 may be configured to switch the mode in which GUI 112 operates based on a determination that a certain event has occurred, as described above with reference to FIGS. 1-9. The first mode of operation may be an "unguided" mode, in which a plurality of user-interactive elements are concurrently displayed to and selectable by the user. The second mode of operation may be a "guided" mode, in which a user is automatically guided through the GUI one user-interactive element at a time. In accordance with an embodiment, each of the user-interactive elements that are sequentially displayed in the second mode of operation is a content identifier for an item of media content that is accessible via one of storage device 1020, first content-providing source 1014, second content-providing source 1016 or third content-providing source 1018.

In accordance with such an embodiment, in the second mode of operation, each of the content identifiers are sequentially displayed for a predetermined period of time before another content identifier is displayed. For example, a first content identifier may be displayed for a first predetermined time period (e.g., 5 seconds). After expiration of the first predetermined time period, a second content identifier (e.g., for content from the same content-providing source or a different content-providing source) is displayed in lieu of the first content identifier for a second predetermined time period, which may or may not be the same as the first predetermined time period. After expiration of the second predetermined time period, a third content identifier is displayed in lieu of the second content identifier, and so on and so forth. At any time while a content identifier is displayed, a user may be select the content identifier. Selection of the content identifier causes electronic device 1002 to retrieve (e.g., from storage device 1020, first content-providing source 1014, second content-providing source 1016 or third content-providing source 1018) the item of media content corresponding to the selected content identifier for playback by display device 1004. The content identifiers that are sequentially displayed and/or the order in which they are displayed may be based on a usage profile or usage model for one or more users that is determined based on the viewing habits of the user(s). Additional details regarding how a user profile or usage model is determined may be found in U.S. patent application Ser. No. 15/248,978, filed on even date herewith and entitled "System and Method for Personalizing and Recommending Content," the entirety of which is incorporated by reference.

In accordance with an embodiment, a suggested search query is displayed along with each of the content identifiers that are sequentially displayed in the second mode. The suggested search query may be user-interactive. Upon a user selecting the suggested search query, the search query is executed with respect to the content-providing source (e.g., storage device 1020, first content-providing source 1014, second-content providing source 1016 or third content-providing source 1018) that provides the item of content identified by the content identifier being displayed. The content-providing source provides search results that are deemed relevant to the search query to electronic device 1002. In accordance with an embodiment, a search engine may be used to process the suggested search query and may generate the search results that are deemed relevant to the search query. Any variety of known or hereinafter-developed search algorithms may be used to implement the search engine. The search engine may be executed by at least one of display device 1004, electronic device 1002, first content-providing source 1014, second content-providing source 1016 and/or third-content providing source 1018. Rendering logic 1006 renders the search results on display device 1004 via GUI 1012.

In accordance with an embodiment, upon switching to the second mode of operation (and before sequentially displaying content-identifiers and/or suggested search queries), GUI 1012 may display one or more prompts (e.g., a messages) to indicate that a switch to the second mode of operation is occurring. In accordance with an embodiment, the prompt(s) are generic prompts. Examples of generic prompts include, but are not limited to "Hello", "Glad you're in here ;)", "Hey there! Did you know I can listen to your requests?", "Need some help choosing?", etc. In accordance with another embodiment, the prompt(s) are customized based on known information, such as day, time, weather, etc. Examples of customized prompts include, but are not limited to, "Good afternoon!", "Yikes, looks wet out there!", "Looks like clear skies tonight!", "It's hump day!", "Whew, made it to Friday." As the user uses GUI 1012 more and more, electronic device 102 may learn about the viewing habits of the user (as described in aforementioned U.S. patent application Ser. No. 15/248,978 and display personalized prompt(s). Examples of personalized prompts include, but are not limited to, "What'd you think of the last episode of Fear the Walking Dead? . . . I felt bad for the dog :(", "Did you know it's time for NFL Monday Night Football? . . . "Don't worry, we won't tell you the score ;)", "How'd you like Cinderalla? . . . Cate Blanchett was pretty great huh?"

In accordance with an embodiment, input interface 1010 is configured to receive a voice-based search query at any time at which the content identifiers and/or suggested search queries are sequentially displayed to the user. A user may initiate the capturing of a voice-based search query by activating a user-interactive element displayed by GUI 1012, which causes electronic device 1004, display device 1002 and/or a remote control device (not shown) configured to control at least one of electronic device 1004 and display device 1002 to capture a voice-based search query via a microphone (not shown) included in at least one of electronic device 1004, display device 1002 and/or the remote control device. In addition to or in lieu of displaying such a user-interactive element, display device 1004, electronic device 1002, and/or the remote control device may include an interactive element (e.g., a button) that, when activated, causes electronic device 1004, display device 1002 and/or the remote control device to capture the voice-based search query. The voice-based search query may be used to find content based thereon from any of storage device 1020, first content-providing source 1014, second content-providing source 1016, and/or third content-providing source 1018 in a similar manner as described above with respect to the suggested search queries displayed along with the content identifiers.

In accordance with an embodiment, after a user has activated an interface element to initiate the capturing of a voice-based search query, suggested search queries may be sequentially displayed to the user. The suggested search queries may be previously-submitted queries that were provided by the user. The suggested search queries may be displayed after a predetermined period of time from when a user has activated an interface element to initiate the capturing of the voice command. For example, suppose a user has activated the interface element, but has not entered in a voice-based search query during the predetermined period of time (e.g., 5 seconds). After expiration of the predetermined time period, rendering logic 1006 may cause GUI 1012 to sequentially display previously-submitted voice-based search queries to assist the user to provide a search query. Each of the sequentially-displayed, suggested search queries may be user-interactive such that a user may be able to select the suggested search queries (e.g., by using the remote control device).

Figure 11:
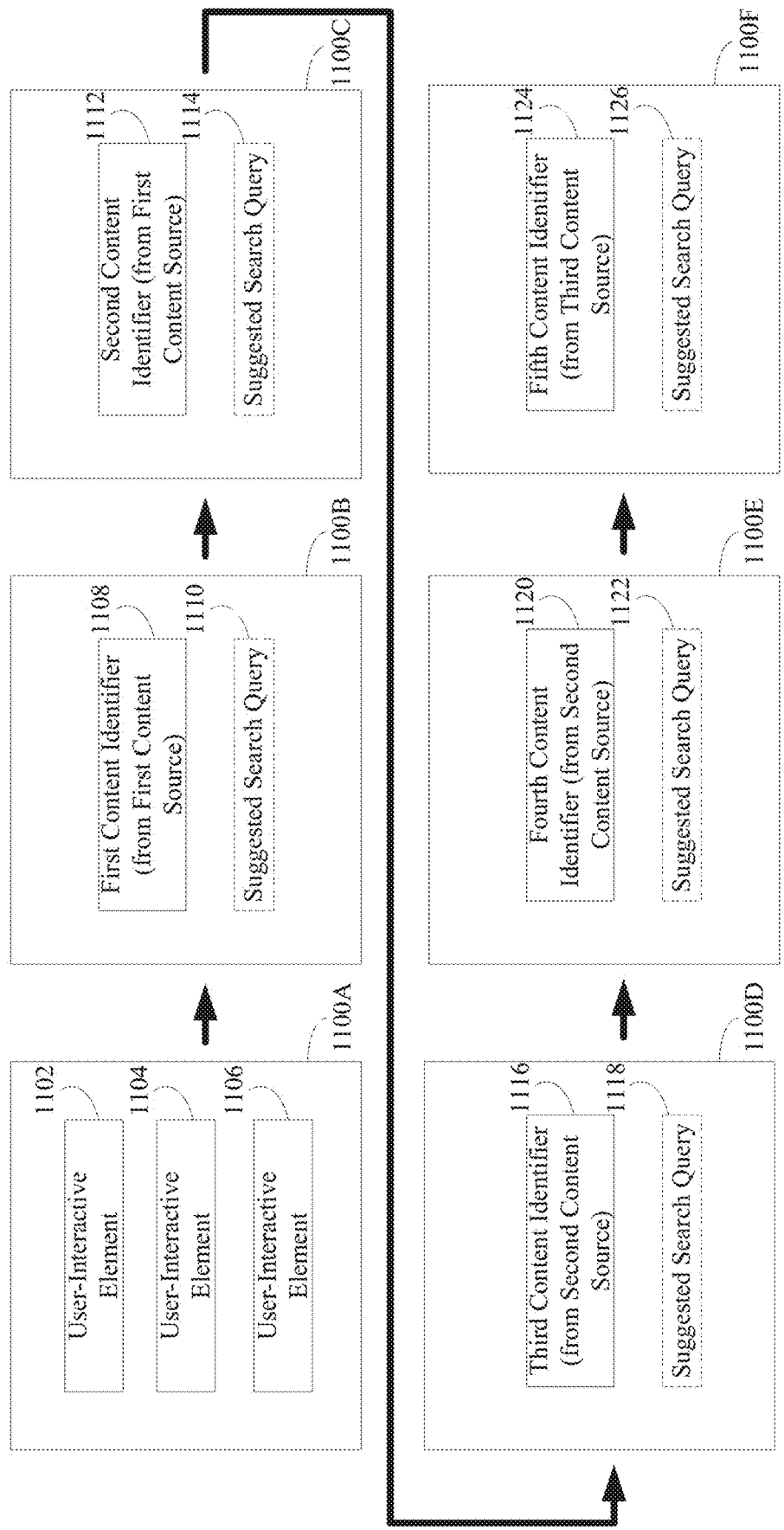
FIG. 11 show example GUI screens that illustrate the automatic recommendation of content from a plurality of different content-providing sources via a second mode of operation of a GUI in accordance with an embodiment.

FIG. 11 shows example GUI screens that illustrate the automatic recommendation of content from a plurality of different content-providing sources via the second mode of operation of GUI 1012, in accordance with an embodiment. FIG. 11 will be described with continued reference to FIG. 10. FIG. 11 shows example GUI screens 1100A, 1100B, 1100C, 1100D, 1100E and 1100F in accordance with an embodiment. GUI screen 1100A illustrates GUI 1012 when GUI 1012 is in the first mode of operation, and GUI screens 1100B, 1100C, 1100D, 1100E and 1100F illustrate GUI 1012 when GUI 1012 is in the second mode of operation. As shown in GUI screen 1100A, a user-interactive element 1102, a user-interactive element 1104 and a user-interactive element 1106 are concurrently displayed to the user. Upon determining that an event has occurred, mode logic 1008 sends a signal to rendering logic 1006. In response, rendering logic 1006 causes GUI 1012 to switch to the second mode of operation, as shown in GUI screen 1100B.

As shown in GUI screen 1100B, only a single user-interactive content identifier (i.e., a first user-interactive content identifier 1108) is displayed to the user and all other user-interactive elements (i.e., user-interactive elements 1102, 1104 and 1106) are no longer displayed to the user. For example, during this stage of the second mode of operation, rendering logic 1006 renders only first user-interactive content identifier 1108 and does not render user-interactive elements 1102, 1104 and 1106. First user-interactive content identifier 1108 identifies an item of media content from a first content-providing source (e.g., first content-providing source 1014). As also shown in GUI screen 1100B, a user-interactive suggested search query 1110 may also be displayed. Suggested search query 1110 may be formed in association with the first content-providing source (e.g., "Show me content to watch form the first content-providing source.").

After a predetermined period of time of user inactivity, first user-interactive content identifier 1108 is replaced by another user-interactive content identifier. For example, as shown in GUI screen 1100C, second user-interactive content identifier 1112 is displayed to the user, and first user-interactive content identifier 1108 is not displayed to the user. For example, during this stage of the second mode of operation, rendering logic 1006 renders only second user-interactive content identifier 1112 and does not render first user-interactive content identifier 1108. As also shown in GUI screen 1100C, a user-interactive suggested search query 1114 may also be displayed. Similar to suggested search query 1110, suggested search query 1114 may be formed in association with the first content-providing source. Suggested search query 1114 may be the same as suggested search query 1110 or may be a different suggested search query.

After a predetermined period of time of user inactivity, second user-interactive content identifier 1112 is replaced by another user-interactive content identifier. For example, as shown in GUI screen 1100D, third user-interactive content identifier 1116 is displayed to the user, and second user-interactive content identifier 1112 is not displayed to the user. For example, during this stage of the second mode of operation, rendering logic 1006 renders only third user-interactive content identifier 1116 and does not render second user-interactive content identifier 1112. In the example shown in GUI screen 1100D, third user-interactive content identifier 1116 identifies an item of media content from a second content-providing source (e.g., second content-providing source 1016). As also shown in GUI screen 1100D, a user-interactive suggested search query 1118 may also be displayed. Suggested search query 1110 may be formed in association with the second content-providing source (e.g., "Show me content to watch form the second content-providing source.").

After a predetermined period of time of user inactivity, third user-interactive content identifier 1116 is replaced by another user-interactive content identifier. For example, as shown in GUI screen 1100E, fourth user-interactive content identifier 1120 is displayed to the user, and third user-interactive content identifier 1116 is not displayed to the user. For example, during this stage of the second mode, rendering logic 1006 renders only fourth user-interactive content identifier 1120 and does not render third user-interactive content identifier 1116. As also shown in GUI screen 1100E, a user-interactive suggested search query 1122 may also be displayed. Similar to suggested search query 1118, suggested search query 1120 may be formed in association with the second content-providing source. Suggested search query 1120 may be the same as suggested search query 1118 or may be a different suggested search query.

After a predetermined period of time of user inactivity, fourth user-interactive content identifier 1120 is replaced by another user-interactive content identifier. For example, as shown in GUI screen 1100F, fifth user-interactive content identifier 1124 is displayed to the user, and fourth user-interactive content identifier 1120 is not displayed to the user. For example, during this stage of the second mode, rendering logic 1006 renders only fifth user-interactive content identifier 1124 and does not render fourth user-interactive content identifier 1120. In the example shown in GUI screen 1100F, fifth user-interactive content identifier 1124 identifies an item of media content from a third content-providing source (e.g., third content-providing source 1018). As also shown in GUI screen 1100F, a user-interactive suggested search query 1126 may also be displayed. Suggested search query 1126 may be formed in association with the third content-providing source (e.g., "Show me content to watch form the third content-providing source.").

Figure 12A:
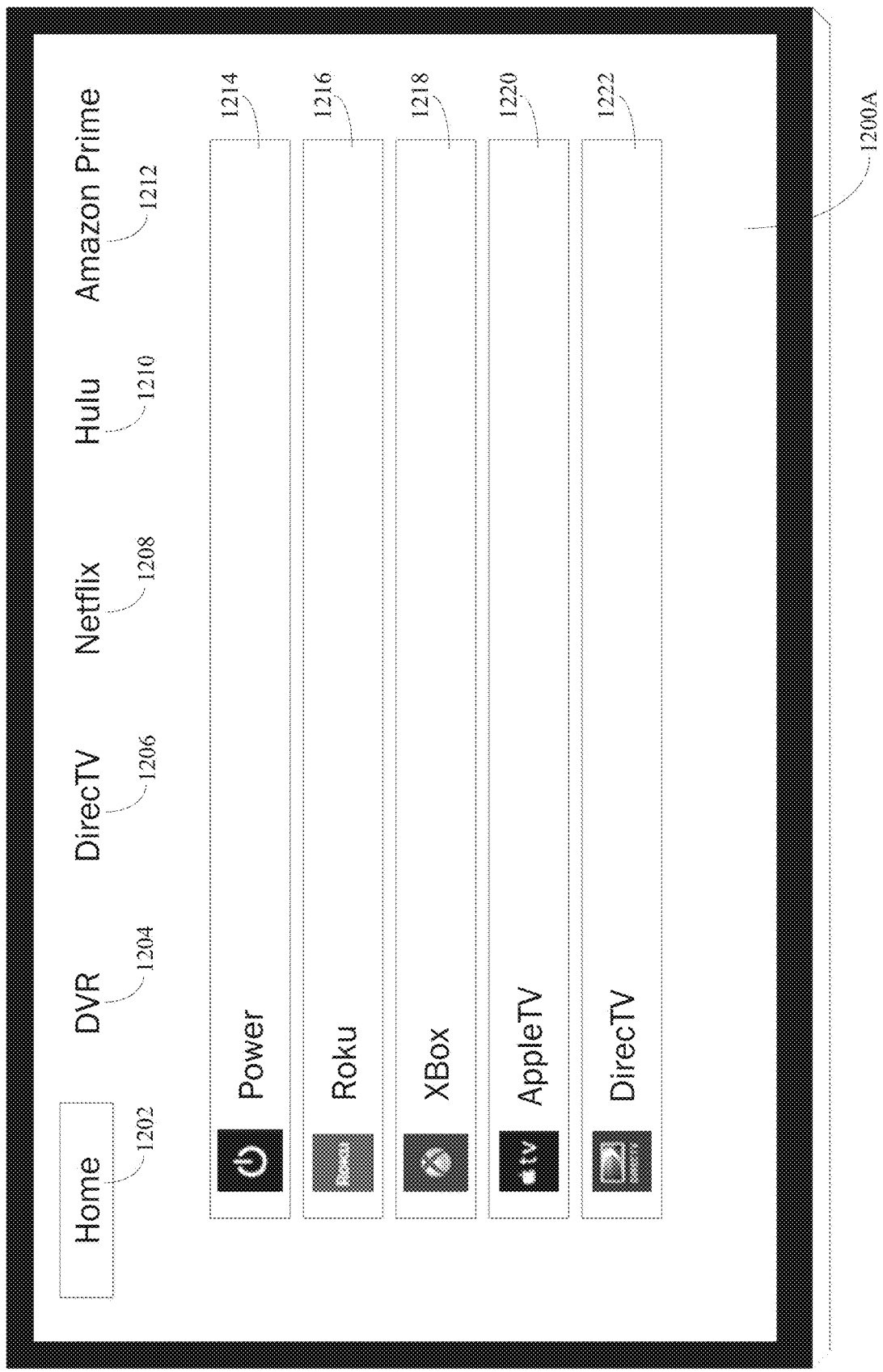
FIG. 12A shows an example GUI screen illustrating a "Home" screen in accordance with an embodiment.
Figure 12B:
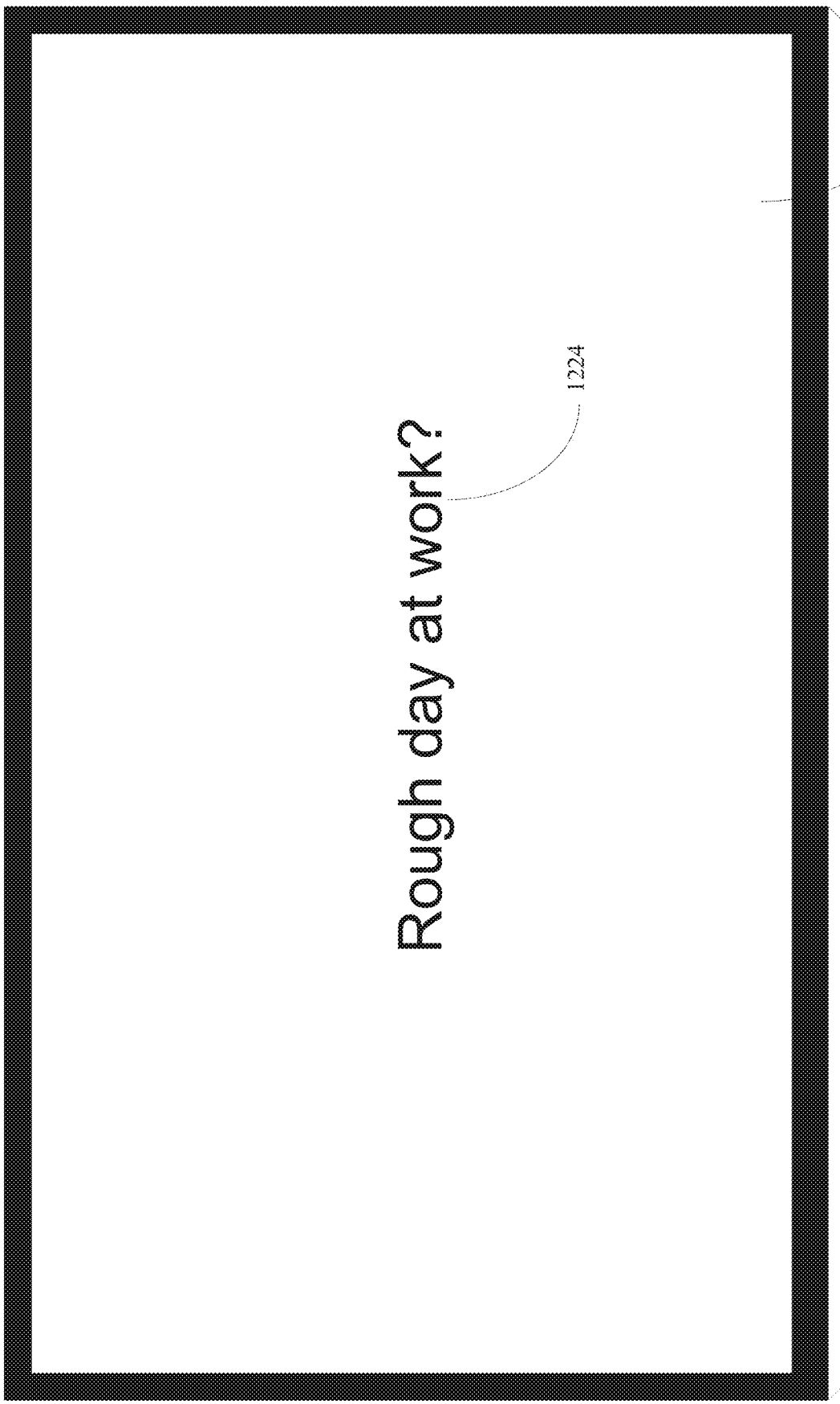
FIG. 12B shows an example GUI screen illustrating a first prompt being displayed in accordance with an embodiment.
Figure 12C:
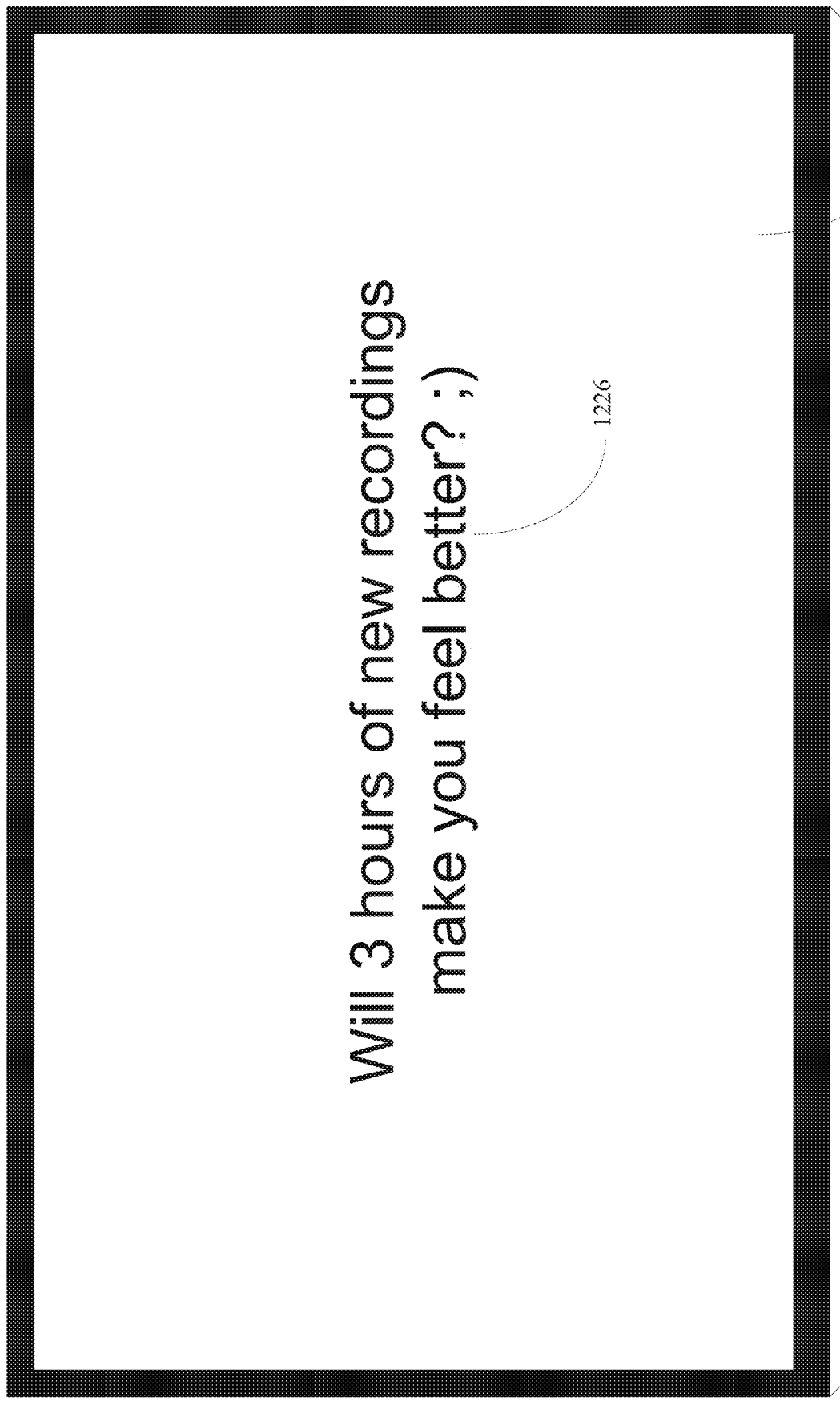
FIG. 12C shows an example GUI screen illustrating a second prompt being displayed in accordance with an embodiment.
Figure 12D:
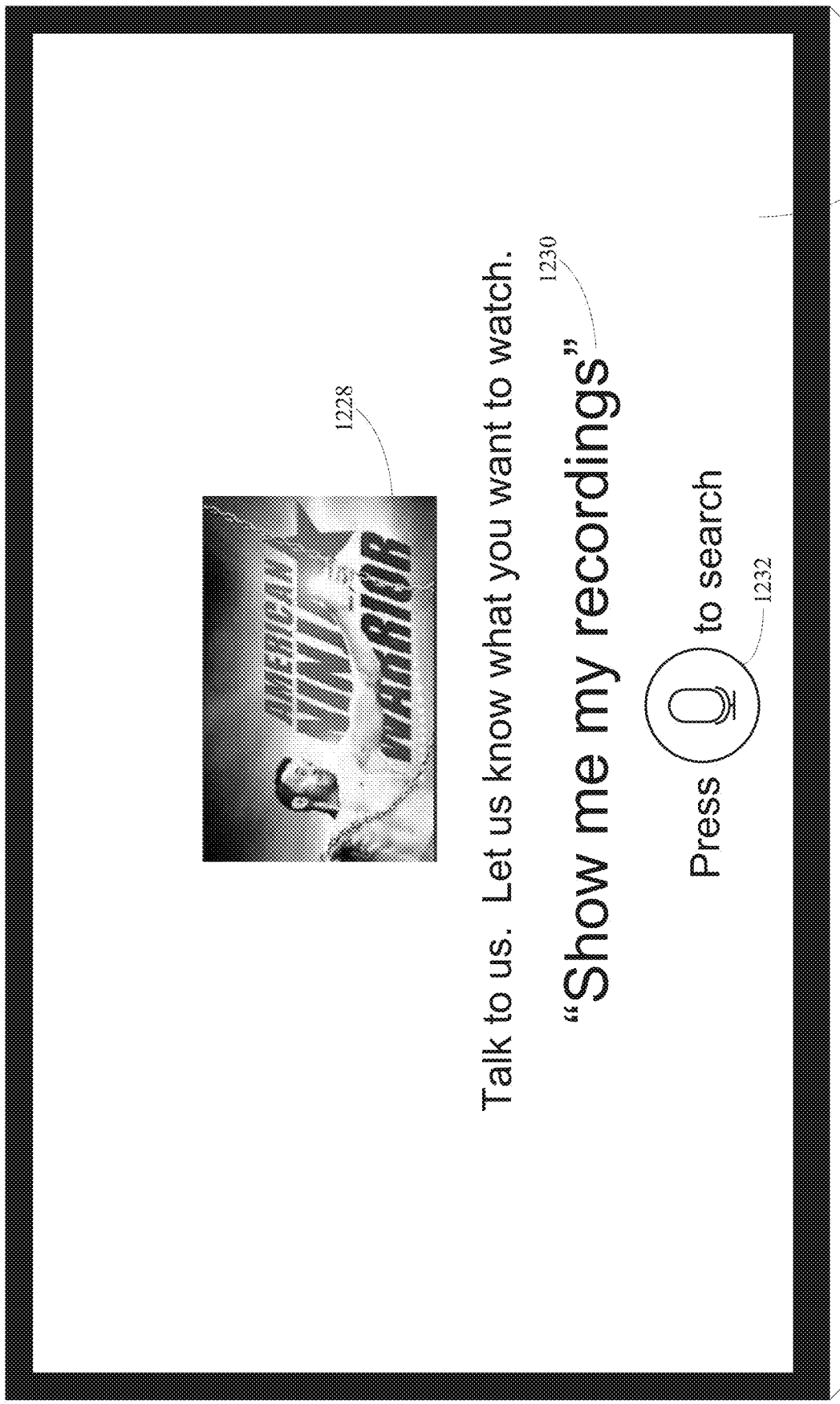
FIG. 12D shows an example GUI screen illustrating a first user-interactive content identifier for an item of media content from a first content-providing source in accordance with an embodiment.
Figure 12E:
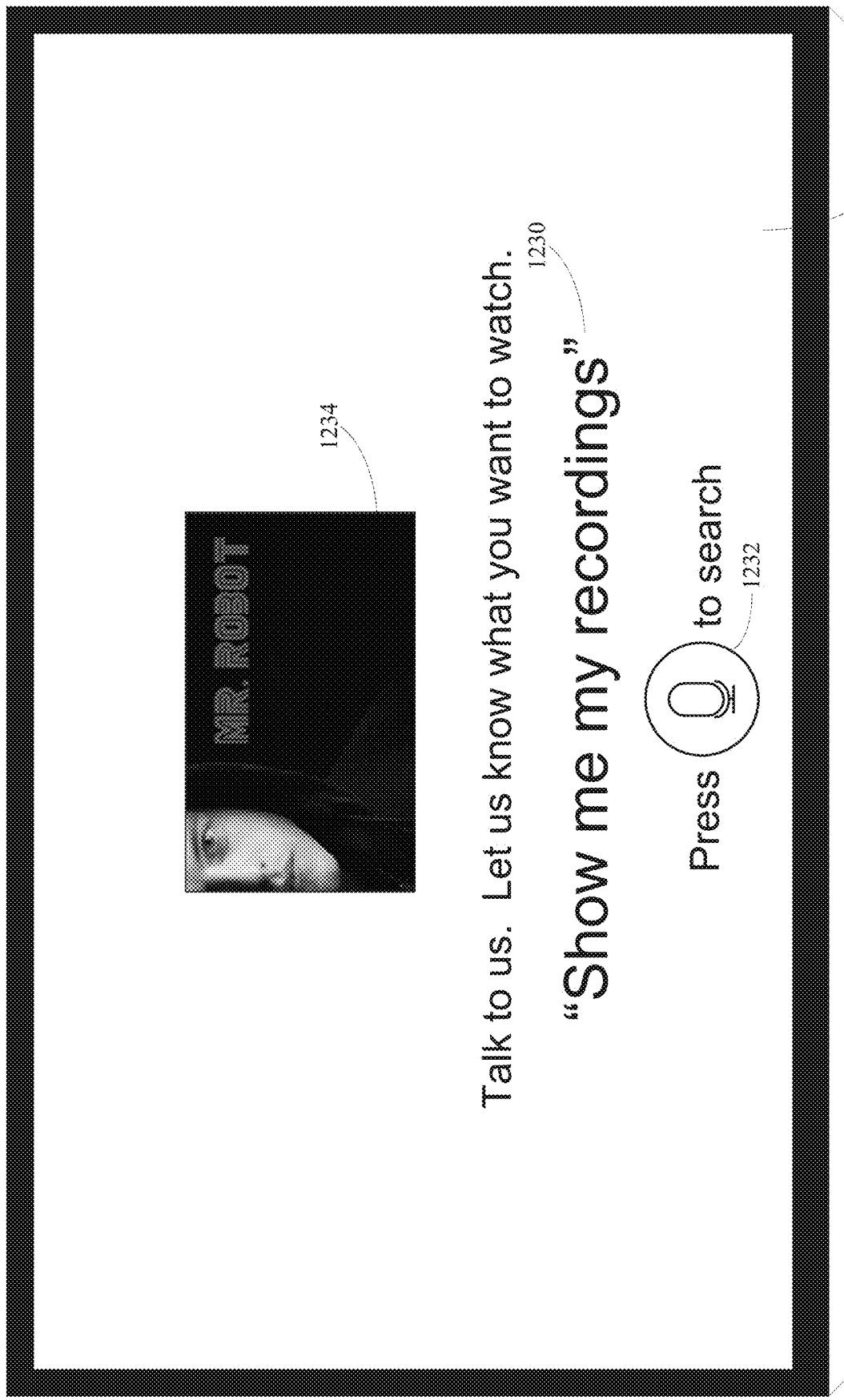
FIG. 12E shows an example GUI screen illustrating a second user-interactive content identifier for an item of media content from the first content-providing source in accordance with an embodiment.
Figure 12F:
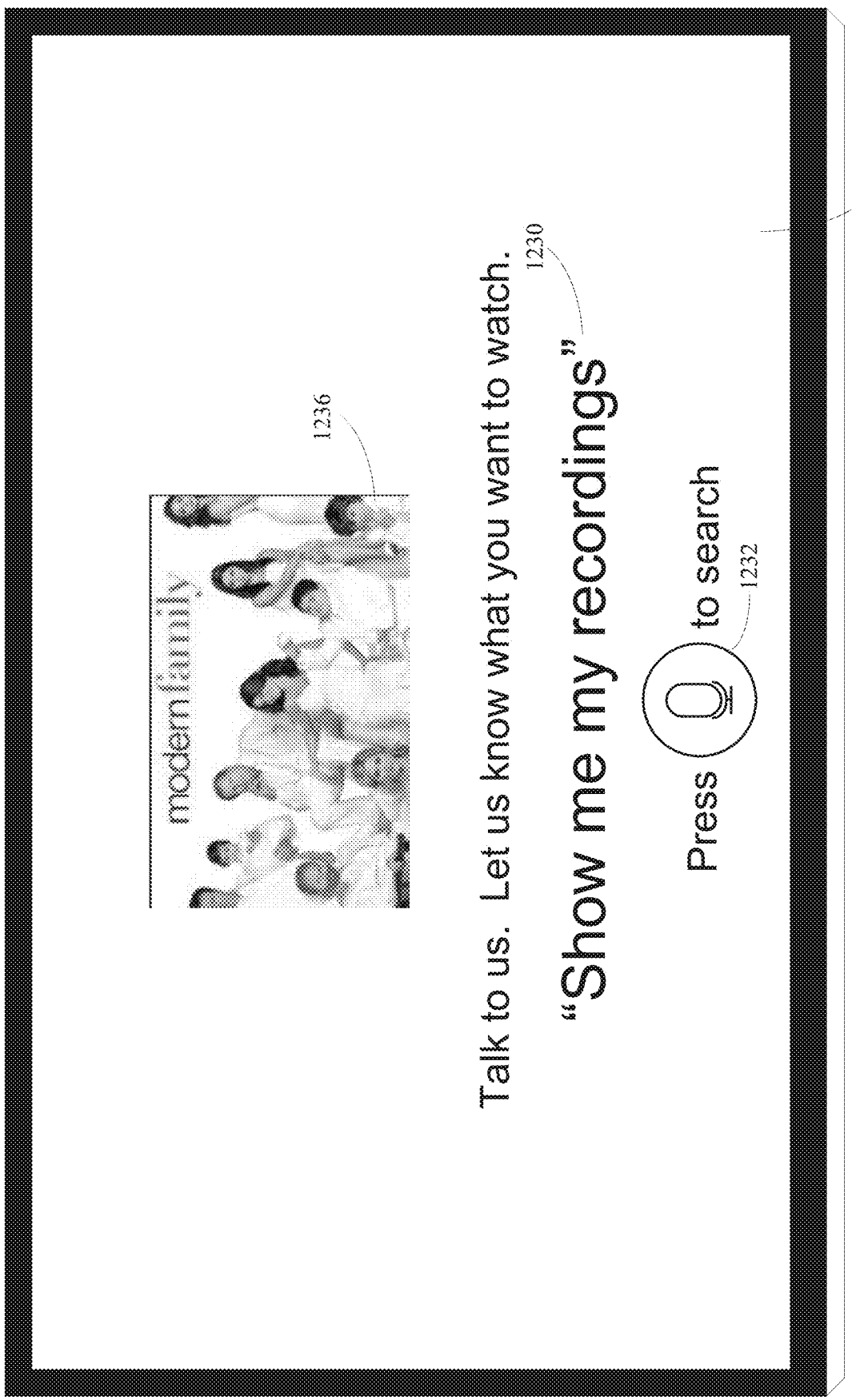
FIG. 12F shows an example GUI screen illustrating a third user-interactive content identifier for an item of media content from the first content-providing source in accordance with an embodiment.
Figure 12G:
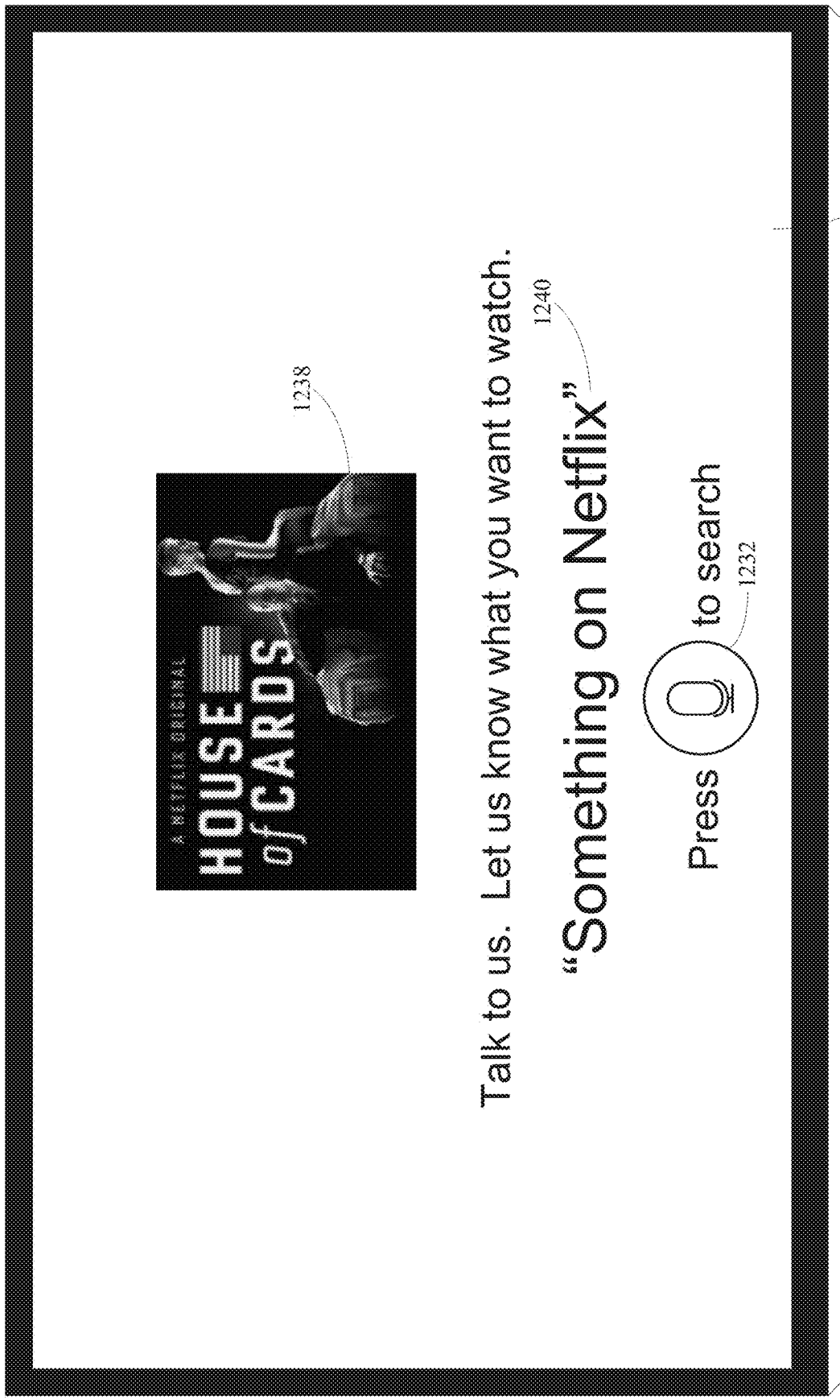
FIG. 12G shows an example GUI screen illustrating a first user-interactive content identifier for an item of media content from a second content-providing source in accordance with an embodiment.
Figure 12H:
FIG. 12H shows an example GUI screen illustrating a second user-interactive content identifier for an item of media content from the second content-providing source in accordance with an embodiment.
Figure 12I:
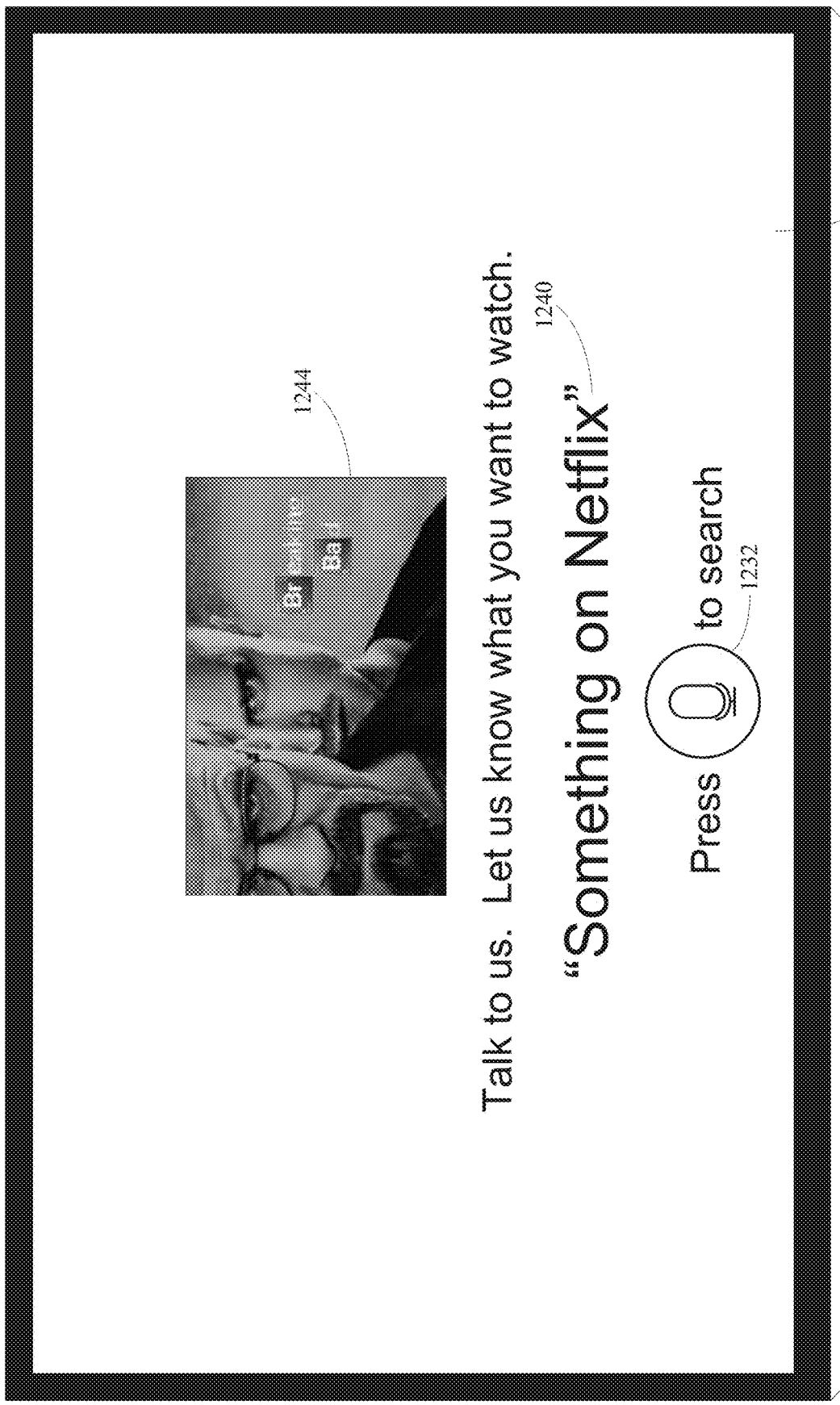
FIG. 12I shows an example GUI screen illustrating a third user-interactive content identifier for an item of media content from the second content-providing source in accordance with an embodiment.
Figure 12J:
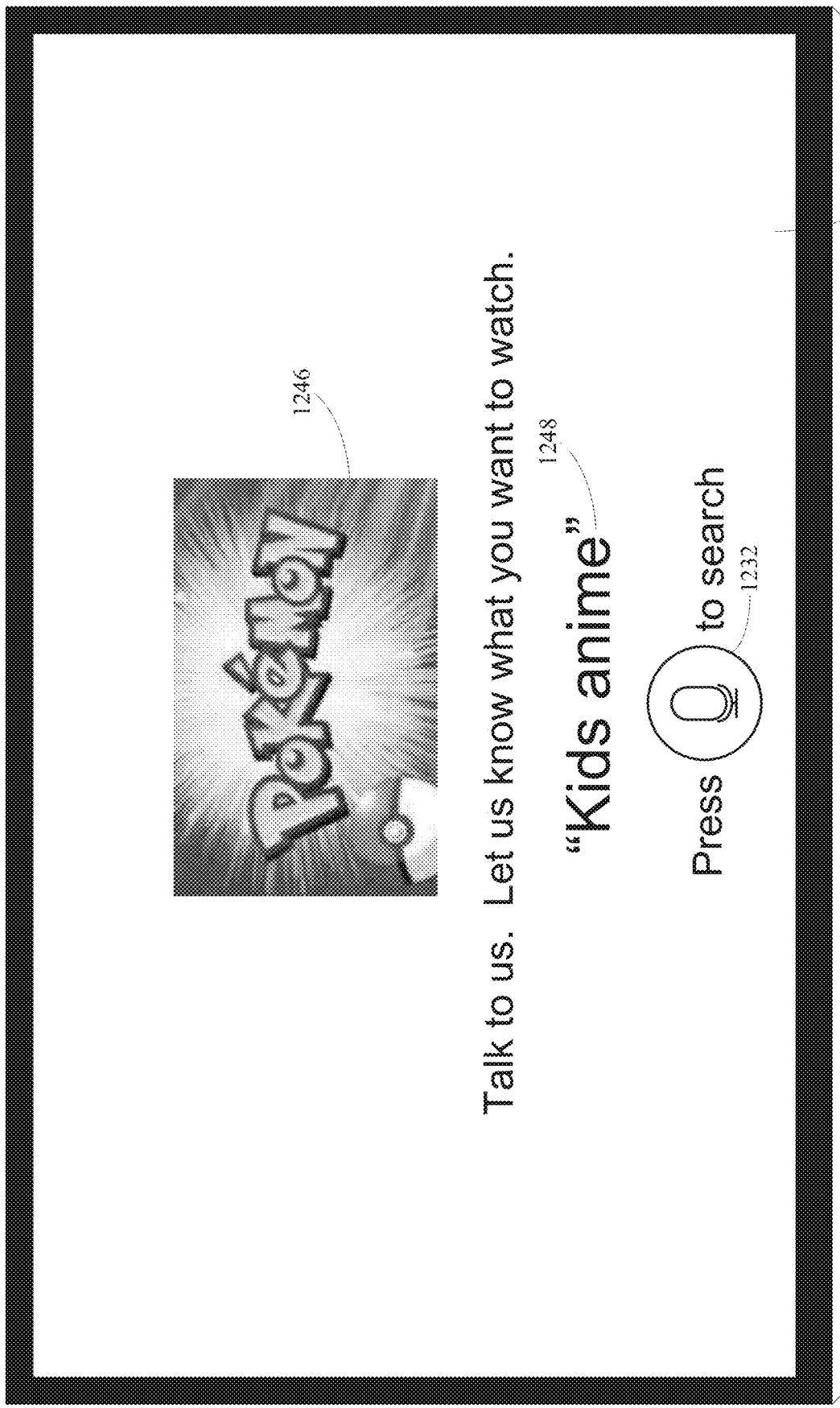
FIG. 12J shows an example GUI screen illustrating a user-interactive content identifier for an item of media content specific to a particular genre in accordance with an embodiment.
Figure 12K:
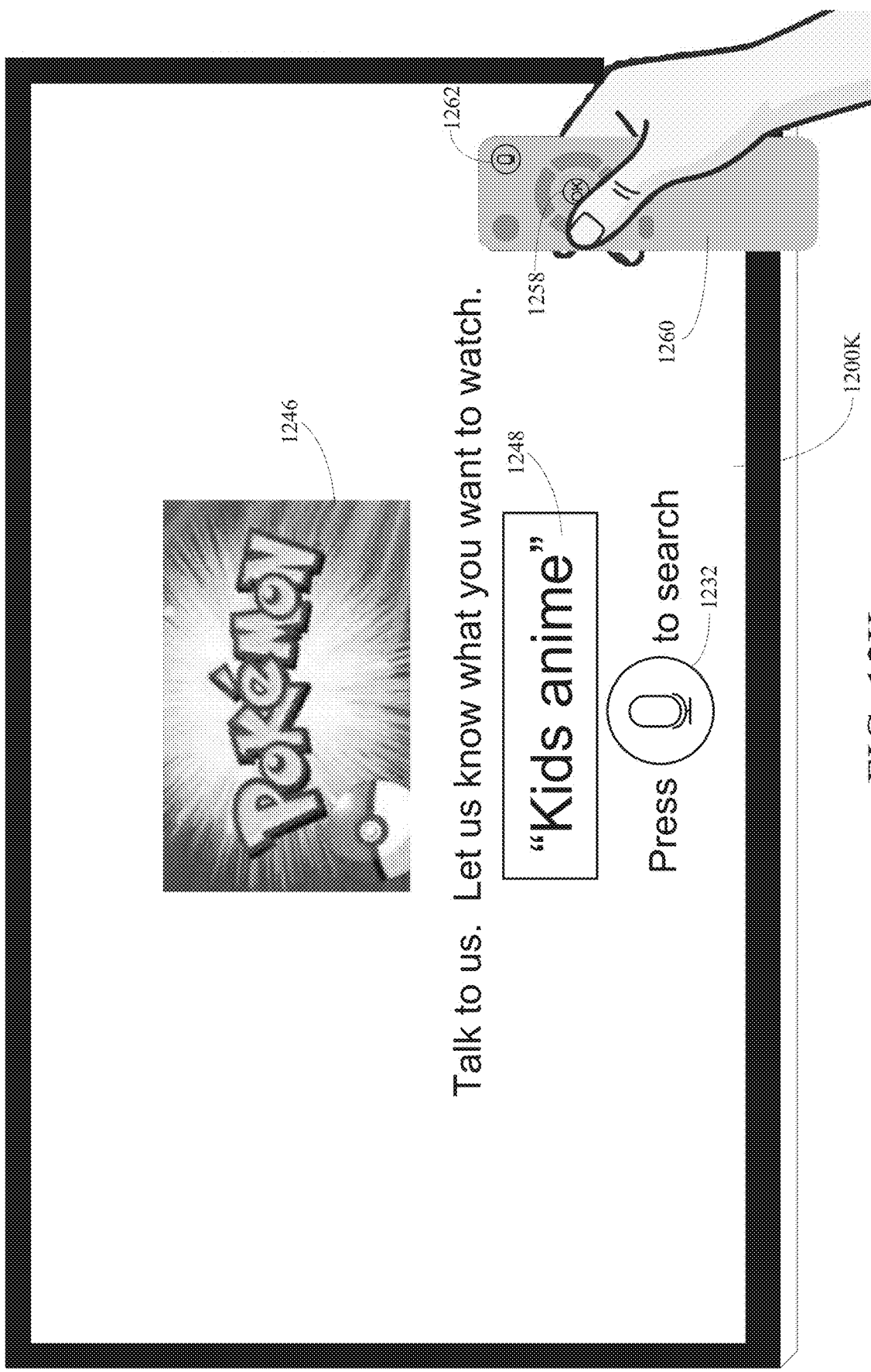
FIG. 12K shows an example GUI screen illustrating activation of a suggested search query in accordance with an embodiment.
Figure 12L:
FIG. 12L shows an example GUI screen enabling a user to enter a voice-based search query in accordance with an embodiment.
Figure 12M:
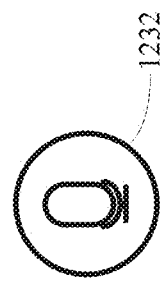
FIG. 12M shows an example GUI screen displaying a voice-based search query entered by a user in accordance with an embodiment.
Figure 12N:
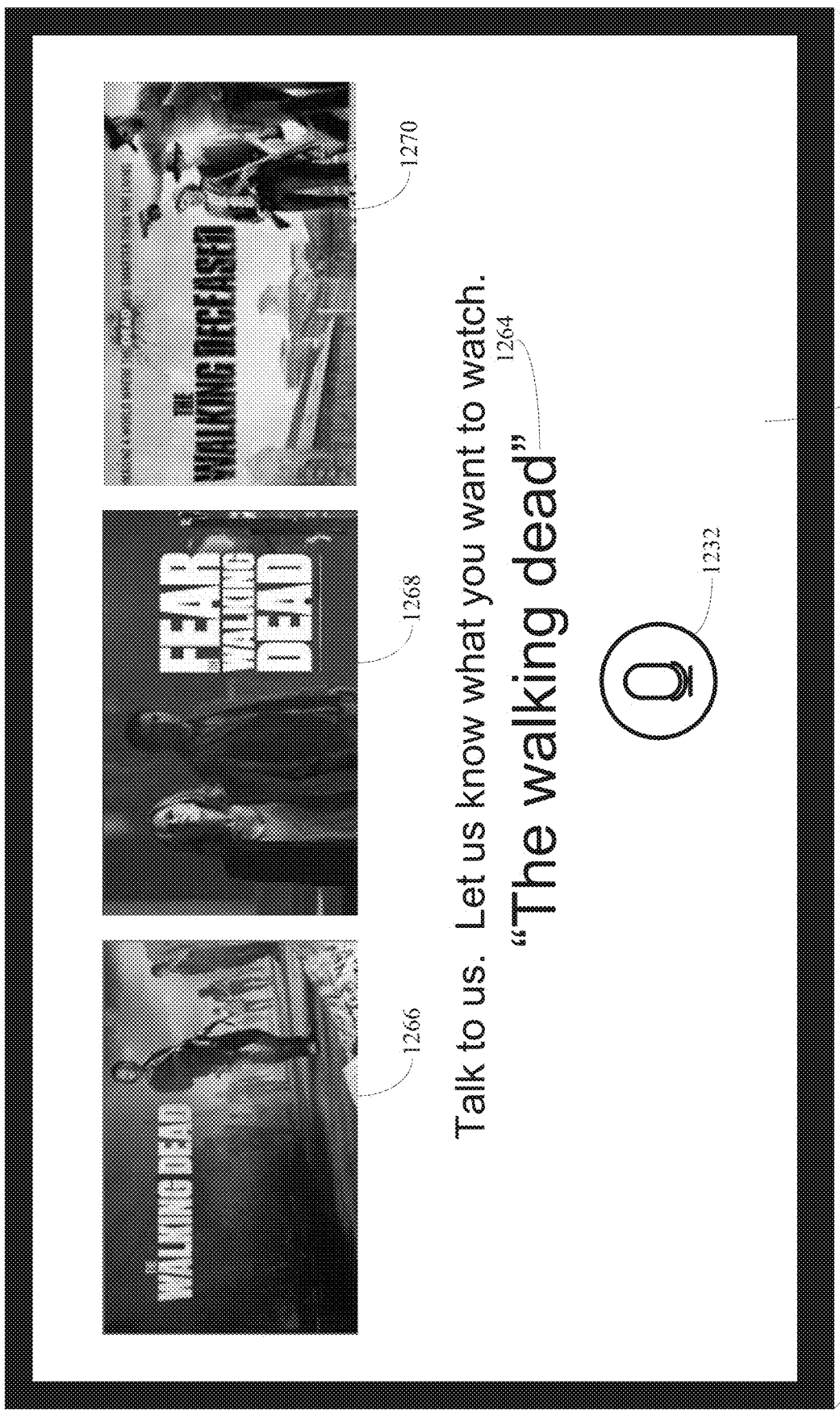
FIG. 12N shows an example GUI screen illustrating user-interactive content identifiers that are presented responsive to processing of the voice-based search query in accordance with an embodiment.
Figure 12O:
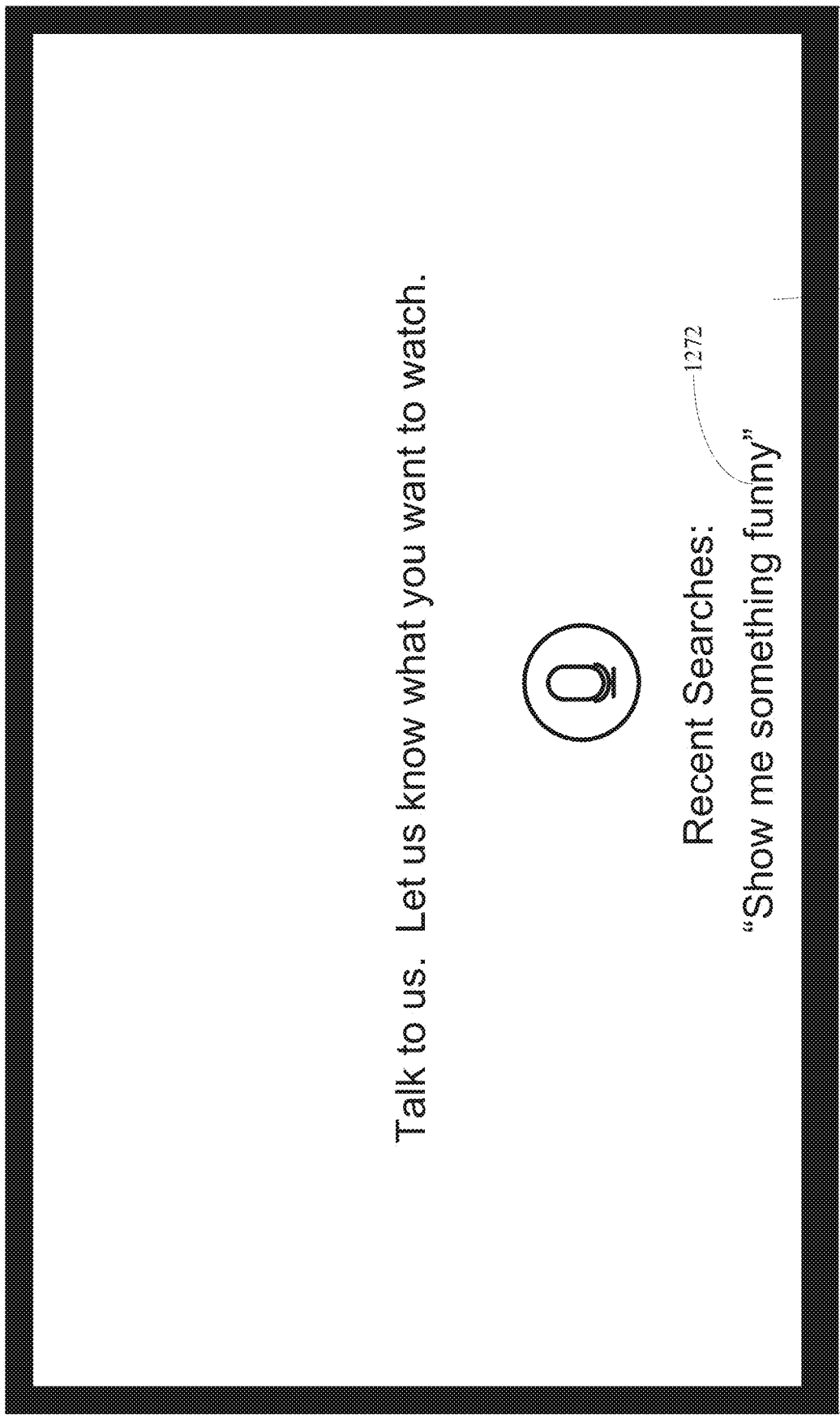
FIG. 12O shows an example GUI screen illustrating a first user-interactive suggested search query that is displayed after not receiving a voice-based search query from a user for a predetermined period of time in accordance with an embodiment.
Figure 12P:
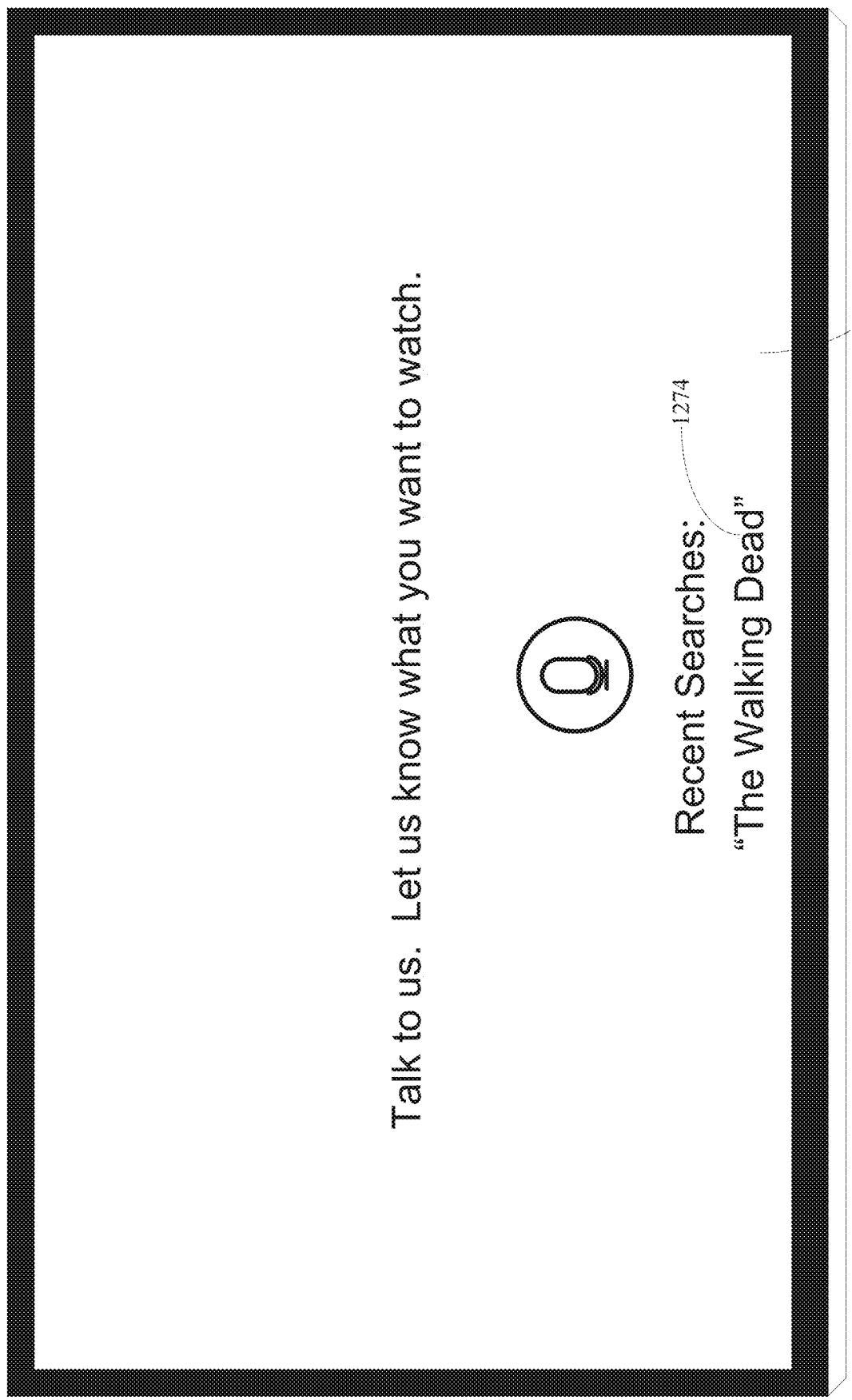
FIG. 12P shows an example GUI screen illustrating a second user-interactive suggested search query that is displayed after not receiving a voice-based search query from a user for a predetermined period of time in accordance with an embodiment.

FIGS. 12A-12P show implementation-specific example GUI screens that illustrate the automatic recommendation of media content from a plurality of different content-providing sources in accordance with an embodiment. FIGS. 12A-12P will be described with continued reference to FIG. 10.

As shown in GUI screen 1200A, a "Home" screen is provided in which a plurality of user-interactive elements 1202, 1204, 1206, 1208, 1210, 1212, 1214, 1216, 1218, 1220 and 1222 are concurrently displayed to the user. GUI screen 1200A is an example of GUI screen 600C, as described above with reference to FIG. 6, and will not be described in detail for the sake of brevity.

After detecting that an event has occurred (e.g., detecting a period of user inactivity), mode logic 1008 sends a signal to rendering logic 1006, which causes GUI 1012 to switch to the second mode of operation. As shown in GUI screen 1200B of FIG. 12B, upon entering the second mode, rendering logic 1006 causes GUI 1012 to display a first prompt 1224 ("Rough day at work?) to the user. First prompt 1224 is a customized prompt based on the time of day. However, first prompt 1224 may be any of type of prompt as described above with reference to FIG. 10.

After a predetermined period of time, first prompt 1224 may be replaced with a second prompt. For example, as shown in GUI screen 1200C of FIG. 12C, rendering logic 1006 causes GUI 1012 to display a second prompt 1226 ("Will 3 hours of new recordings make you feel better? ;)") and no longer displays first prompt 1224. Second prompt 1226 is a personalized prompt based on the amount of media content recorded for the user for a given time period. However, second prompt 1226 may be any of type of prompt as described above with reference to FIG. 10.

After a predetermined period of time, second prompt 1226 is no longer displayed and a first user-interactive content identifier from a first content-providing source is displayed. For example, as shown in GUI screen 1200D of FIG. 12D, rendering logic 1006 causes GUI 1012 to display user-interactive content identifier 1228 for an item of content from a first content-providing source. In the example shown in GUI screen 1200D, the content-providing source is locally stored (e.g. on a "DVR"). For example, referring to FIG. 10, electronic device 1002 may be a DVR, and the content-providing source is storage device 1020. As also shown on GUI screen 1200D, a suggested search query 1230 ("Show me my recordings") is displayed. Selection of suggested search query 1230 causes a listing of one or more items of media content stored locally (e.g., on storage device 1020) to be displayed. As further shown in GUI screen 1200D, a user-interactive element 1232 is displayed, which, when activated, enables the user to enter a voice-based search query.

After a predetermined period of time of user inactivity, another user-interactive content identifier is displayed for an item of media content from the same content-providing source. For example, as shown in GUI screen 1200E of FIG. 12E, rendering logic 1006 causes GUI 1012 to display user-interactive content identifier 1234, which is for an item of media content from the first content-providing source. After another predetermined period of time of user inactivity, another user-interactive content identifier for an item of media content from the same content-providing source is displayed. For example, as shown in GUI screen 1200F of FIG. 12F, rendering logic 1006 causes GUI 1012 to display user-interactive content identifier 1236, which is also for an item of media content from the first content-providing source. It is noted that while GUI screens 1200D-1200F show that three user-interactive content-identifiers from the same content-providing source are sequentially displayed to a user, any number of user-interactive content-identifiers for media content from the same content-providing source may be displayed.

After sequentially displaying user-interactive content identifier(s) from a first content-providing source and determining that a user has not selected any such user-interactive content identifier(s), rendering logic 1006 causes GUI 1012 to display user-interactive content identifier(s) from another content-providing source. For example, as shown in GUI screen 1200G of FIG. 12G, rendering logic 1006 causes GUI 1012 to display user-interactive content identifier 1238, which is for an item of media content from a second content-providing source (e.g., "Netflix™"). As also shown on GUI screen 1200G, a different suggested search query (e.g., suggested search query 1240 ("Something on Netflix")) is displayed. Selection of suggested search query 1240 causes a listing of one or more items of media content accessible via the second-content providing source to be displayed.

After a predetermined period of time of user inactivity, another user-interactive content identifier for media content accessible via the second content-providing source is displayed. For example, as shown in GUI screen 1200H of FIG. 12H, rendering logic 1006 causes GUI 1012 to display user-interactive content identifier 1242, which is also for an item of media content from the second content-providing source. After another predetermined period of time of user inactivity, another user-interactive content identifier for an item of media content provided from the second content-providing source is displayed. For example, as shown in GUI screen 1200I of FIG. 12I, rendering logic 1006 causes GUI 1012 to display user-interactive content identifier 1244, which is also for an item of media content from the second content-providing source. It is noted that while GUI screens 1200G-1220I show that three user-interactive content-identifiers from the same content-providing source (i.e., the second content-providing source) are sequentially displayed to a user, any number of user-interactive content-identifiers for media content from the second content-providing source may be displayed.

After sequentially displaying user-interactive content identifier(s) from the second content-providing source and determining that a user has not selected any such user-interactive content identifier(s), rendering logic 1006 may cause GUI 1012 to display content identifier(s) from another content-providing source in a similar manner as describe above with reference to FIGS. 12D-12I.

Alternative to displaying user-interactive content identifier(s) specific for a particular content-providing source, rendering logic 1006 may cause GUI 1012 to display genre-specific content identifier(s). For example, as shown in GUI screen 1200J of FIG. 12J, rendering logic 1006 causes GUI 1012 to display user-interactive content identifier 1246, which is for an item of media content specific to the genre "Kids anime". User-interactive content identifier 1246 may identify an item of content from any content-providing source (e.g., storage device 1020, first content-providing source 1014, second content-providing source 1016 or third content-providing source 1018) coupled to electronic device 1002. As also shown on GUI screen 1200I, a suggested search query (e.g., suggested search query 1248 ("Kids anime")) pertaining to the genre is displayed. Selection of suggested search query 1248 causes a listing of one or more items of media content accessible via any content-providing source to which electronic device 1002 is coupled to be displayed. Any number of user-interactive content identifier(s) for any number of genres may be sequentially displayed to the user in a similar manner as described above with reference to FIGS. 12D-12J.

As described above, any of the suggested search queries (e.g., suggested search queries 1230, 1240 and/or 1248) may be interacted with by the user. For example, FIG. 12K shows a GUI screen 1200K where a user has activated suggested search query 1248 via an interface element 1258 (e.g., an "OK" button) of a remote control device 1260 configured to control GUI 1012. Upon pressing interface element 1258, suggested search query 1248 is executed (e.g., by a search engine) with respect to at least one of storage device 1020, first content-providing source 1014, second content-providing source 1016 and third content-providing source 1018. In response, a search engine executing on at least one of electronic device 1002, first content-providing source 1014, second content-providing source 1016 and/or third content-providing source 1018 provides a listing of items of media content that are determined to be relevant to the suggested search query 1248. Rendering logic 1006 renders the listing on display device 1004 via GUI 1012.

As further shown in FIG. 12K, remote control device 120 may further include an interface element 1262, which, when activated, enables a user to enter a voice-based search query. For example, electronic device 1004, display device 1002 and/or remote control device may be configured to capture a voice-based search query via a microphone (not shown) included in at least one of electronic device 1004, display device 1002 and/or the remote control device 1260.

FIG. 12L shows a GUI screen 1200L where a user has activated interface element 1262. As shown in GUI screen 1200L, upon activating interface element 1262, any user-interactive elements that were displayed are no longer rendered, and a microphone included in at least one of electronic device 1004, display device 1002 and/or remote control device 1260 awaits voice input from the user.

After a user enters a voice-based search query, rendering logic 1006 may cause GUI 1012 to display the voice-based search query. For example, as shown in GUI screen 1200M of FIG. 12M, a voice-based search query 1264 (e.g., "The Walking Dead") entered by the user is displayed. Voice-based search query 1264 is executed with respect to at least one of storage device 1020, first content-providing source 1014, second content-providing source 1016 and third content-providing source 1018. In response, at least one of storage device 1020, first content-providing source 1014, second content-providing source 1016 and third content-providing source 1018 provides a listing of items of media content that match or are otherwise deemed relevant to voice-based search query 1264. Rendering logic 1006 renders the listing on display device 1004 via GUI 1012. For example, as shown in GUI screen 1200N of FIG. 12N, rendering logic 1006 causes GUI 1012 to rendering a listing user-interactive content identifiers (e.g., user-interactive content identifiers 1266, 1268, 1270) that are returned after processing voice-based search query 1264.

In accordance with an embodiment, in the event that a user has activated interface element 1264 but has not entered in a voice-based search query for a predetermined period of time, rendering logic 1006 may cause GUI 1012 to sequentially display one or more user-interactive suggested search queries. The user-interactive suggested search quer(ies) may be based on past voice-based search queries entered by the user.

For example, FIG. 12O shows an example GUI screen 1200O that displays a user-interactive suggested search query 1272 ("Show me something funny") after not receiving a voice-based search query from a user for predetermined period of time. Rendering logic 1006 may cause user-interactive suggested search query 1272 to be displayed for a predetermined period of time. After expiration of the predetermined period of time, rendering logic 1006 may cause GUI 1012 to display another user-interactive suggested search query. For example, as shown in GUI screen 1200P of FIG. 12P, rendering logic 1006 causes GUI 1012 to display a user-interactive suggested search query 1274 ("The Walking Dead") and no longer display user-interactive suggested search query 1272.

It is noted that while GUI screens 1200O and 1200P show that two user-interactive suggested search queries are sequentially displayed to a user, any number of user-interactive suggested search queries may be displayed.

Figure 13:
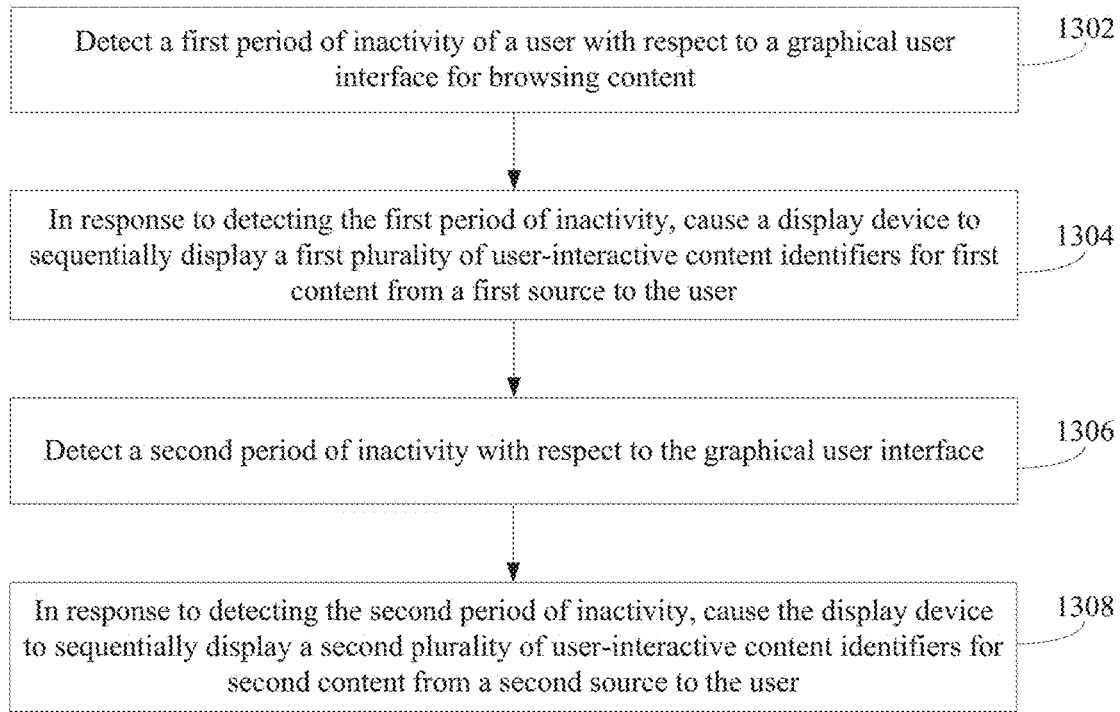
FIG. 13 shows a flowchart of a method for the automatic recommendation of media content from a plurality of different content-providing sources in accordance with an embodiment.
Figure 14:
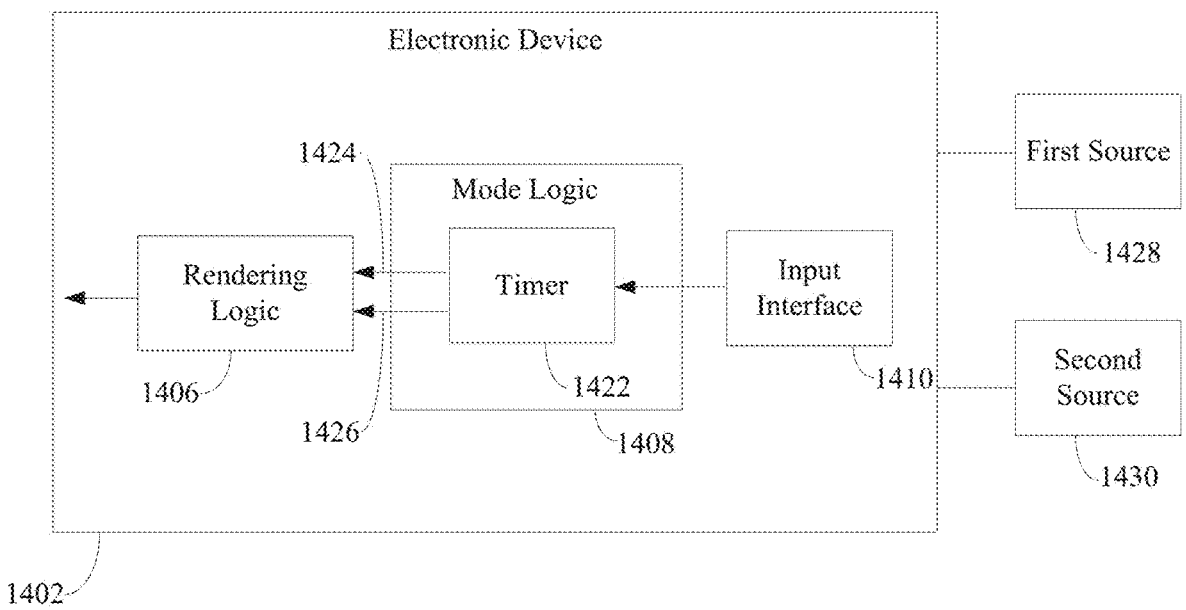
FIG. 14 shows an example electronic device in accordance with another embodiment.

Accordingly, in embodiments, the automatic recommendation of media content from a plurality of different content-providing sources may be implemented in many ways. For instance, FIG. 13 depicts a flowchart 1300 of a method for the automatic recommendation of media content from a plurality of different content-providing sources in accordance with an embodiment. The method of flowchart 1300 may be implemented by an electronic device 1402 shown in FIG. 14. FIG. 14 is a block diagram of electronic device 1402 in accordance with an embodiment. Electronic device 1402 may be an example of electronic device 1002, as described above with reference to FIG. 10. As shown in FIG.

14, electronic device 1402 includes rendering logic 1406, mode logic 1408 and an input interface 1410. Rendering logic 1406, mode logic 1408 and input interface 1410 are examples of rendering logic 1006, mode logic 1008 and an input interface 1010, as shown in FIG. 10. As further shown in FIG. 14, electronic device 1402 is coupled to a first source 1428 and a second source 1430. First source 1428 and/or second source 1430 may be an example of storage device 1020, first content-providing source 1014, second content-providing source 1016 or third content-providing source 1018, as shown in FIG. 10. As shown in FIG. 14, mode logic 1408 includes a timer 1422. Other structural and operational embodiments will be apparent to persons skilled in the relevant art(s) based on the following discussion regarding flowchart 1300 and electronic device 1402.

Flowchart 1300 begins with step 1302. At step 1302, a first period of inactivity of a user with respect to a GUI for browsing content is detected. For example, with reference to FIG. 14, timer 1422 may keep track of the amount of time that has occurred since input interface 1410 received input from the user. When the amount of time equals the first period, timer 1422 detects that the first period of inactivity has occurred.

At step 1304, in response to detecting the first period of inactivity, a display device is caused to sequentially display a first plurality of user-interactive content identifiers for first content from a first source to the user. For example, with reference to FIG. 14, in response to timer 1422 detecting the first period of inactivity, mode logic 1408 sends a first signal 1424 to rendering logic 1406. Upon receiving first signal 1424, rendering logic 1406 may execute and render the GUI in the second mode on a display device (e.g., display device 1004, as shown in FIG. 10). In the second mode, rendering logic 1406 causes a first plurality of user-interactive content identifiers for first content from first source 1428 to the user to be sequentially displayed on the display device.

At step 1306, a second period of inactivity of a user with respect to the GUI is detected. For example, with reference to FIG. 14, timer 1422 may keep track of the amount of time that has occurred since input interface 1410 received input from the user since the first content identifiers were being sequentially displayed on the display device. When the amount of time equals the second period, timer 1422 detects that the second period of inactivity has occurred.

At step 1308, in response to detecting the second period of inactivity, the display device is caused to sequentially display a second plurality of user-interactive content identifiers for first content from a second source to the user. For example, with reference to FIG. 14, in response to timer 1422 detecting the second period of inactivity, mode logic 1408 sends a second signal 1426 to rendering logic 1406. Upon receiving second signal 1426, rendering logic 1406 causes a second plurality of user-interactive content identifiers for second content from second source 1430 to the user to be sequentially displayed on the display device.

In accordance with an alternate embodiment, the progression through steps 1302-1308 could be triggered by something other than periods of inactivity. For example, the progression through steps 1302-1308 may be caused by a user providing certain predefined input via input interface 1410. The predefined input may comprise, for example, an interaction with a certain user-interactive element currently being displayed via the GUI, or an interaction with a button of electronic device 1402, a display device (e.g., display device 1004, as shown in FIG. 10), or a remote control device (e.g., remote control device 1260, as shown in FIG. 12K) that is configured to control electronic device 1402 or the display device.

In accordance with one or more embodiments, one or more prompts are displayed to the user via the GUI before any of the first plurality of content identifiers are sequentially displayed to the user. For example, with reference to FIG. 14, rendering logic 1406 may cause GUI to display prompt(s) before any of the first plurality of content identifiers are sequentially displayed.

In accordance with one or more embodiments, a first suggested search query is displayed with each of the first plurality of user-interactive content identifiers that are sequentially displayed to the user and a second suggested search query is displayed with each of the second plurality of user-interactive content identifiers that are sequentially displayed to the user. For example, with reference to FIG. 14, rendering logic 1406 may cause GUI to display the first suggested search query and the second suggested search query.

In accordance with one or more embodiments, the first suggested search query and the second suggested search query are user-interactive.

In accordance with one or more embodiments, a voice-based search query is received during display of any of the first plurality of user-interactive content identifiers and the second plurality of user-interactive content identifiers that are being sequentially displayed to the user. The voice-based search query is executed with respect to at least one of the first source and the second source. For example, with reference to FIG. 14, input interface 1410 may include a microphone (not shown) which receives the voice-based search query. Electronic device 1002 may execute the voice-based search query with respect to at least one of first source 1428 and second source 1430.

In accordance with one or more embodiments, selection of a first user-interactive content identifier of the first plurality of user-interactive content identifiers causes first content associated with the selected, first user-interactive content identifier to be retrieved from the first source for playback by the display device, and selection of a second user-interactive content identifier of the second plurality of user-interactive content identifiers causes second content associated with the selected, second user-interactive content identifier to be retrieved from the second source for playback by the display device. For example, with reference to FIG. 14, input interface 1410 may receive a selection of the first user-interactive content identifier or the second user-interactive content identifier. Upon receiving the selection of the first user-interactive content identifier, electronic device 1002 causes first content associated with selected, first user-interactive content identifier to be retrieved from first source 1428 for playback by the display device. Upon receiving the selection of the second user-interactive content identifier, electronic device 1002 causes second content associated with selected, second user-interactive content identifier to be retrieved from second source 1430 for playback by the display device.

IV. Example Computer System Implementation

Embodiments described herein, such as system 100 and system 1000, along with any respective components/sub-components thereof, and/or any flowcharts, further systems, sub-systems, components, and/or embodiments disclosed herein may be implemented in hardware (e.g., hardware logic/electrical circuitry), or any combination of hardware with one or both of software (computer program code or instructions configured to be executed in one or more processors or processing devices) and firmware. In embodiments with respect to the example computer implementations in this Section, main memory, memory cards and memory sticks, memory devices, and/or the like may include and or implement the described techniques and embodiments.

Figure 15:
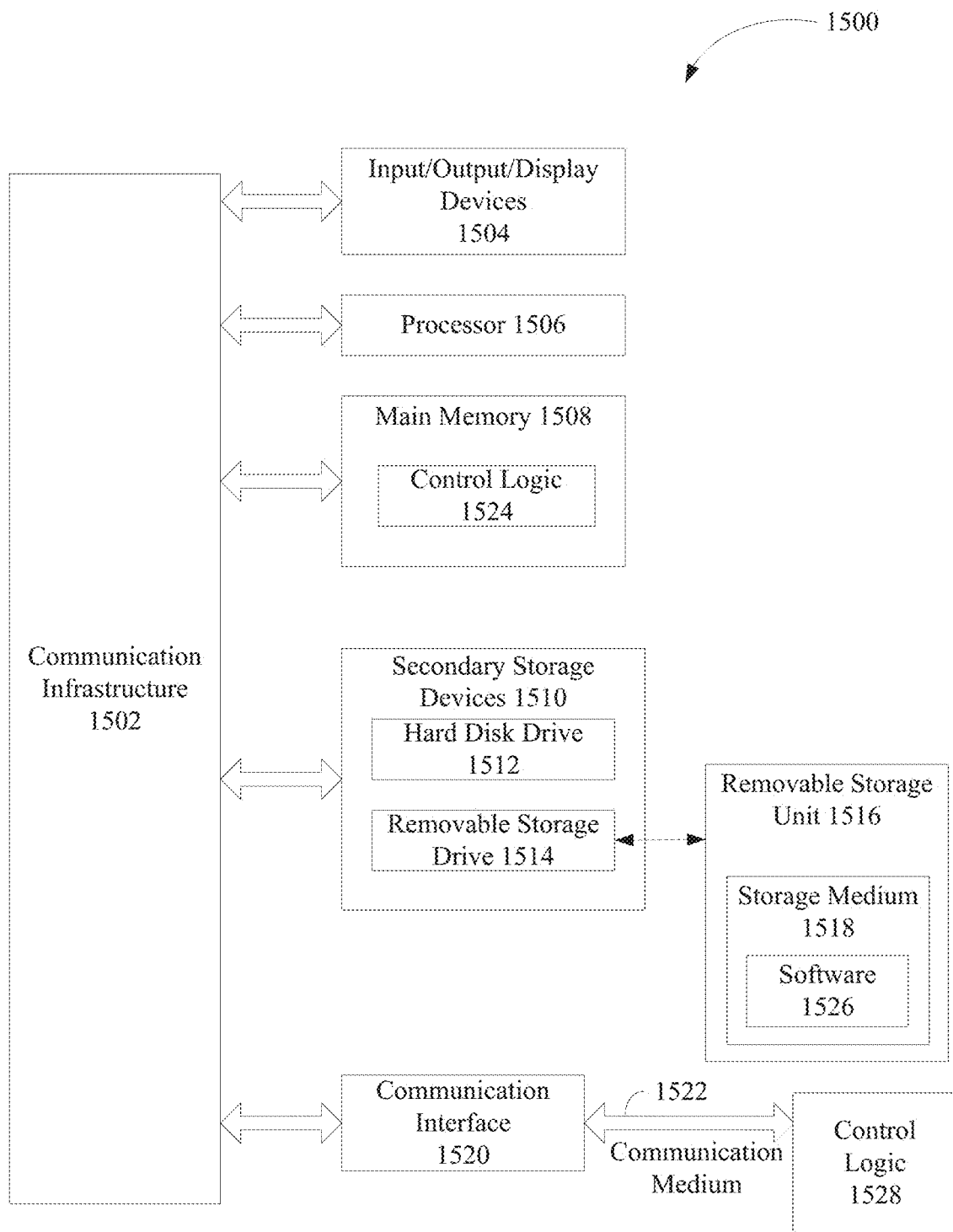
FIG. 15 shows a block diagram of a processing device/system in which the techniques disclosed herein may be performed and the embodiments herein may be implemented and/or utilized.

The embodiments described herein, including devices, systems, methods/processes, and/or apparatuses, may be implemented in or using well known processing devices, communication systems, servers, and/or, computers, such as a processing device 1500 shown in FIG. 15. It should be noted that processing device 1500 may represent mobile devices, communication devices/systems, entertainment systems/devices, processing devices, and/or traditional computers in one or more embodiments. For example, a transceiver as described herein, and any of the sub-systems and/or components respectively contained therein and/or associated therewith, may be implemented in or using one or more processing devices 1500 and/or similar computing devices.

Processing device 1500 includes one or more processors (also called central processing units, or CPUs), such as a processor 1506. Processor 1506 is connected to a communication infrastructure 1502, such as a communication bus. In some embodiments, processor 1506 can simultaneously operate multiple computing threads, and in some embodiments, processor 1506 may comprise one or more processors.

Processing device 1500 also includes a primary or main memory 1508, such as random access memory (RAM). Main memory 1508 has stored therein control logic 1524 (computer software), and data.

Processing device 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, processing device 1500 may include an industry standard interface, such a universal serial bus (USB) interface for interfacing with devices such as a memory stick. Removable storage drive 1514 represents a floppy disk drive, a magnetic tape drive, a compact disk drive, an optical storage device, tape backup, etc.

Removable storage drive 1514 interacts with a removable storage unit 1516. Removable storage unit 1516 includes a computer useable or readable storage medium 1518 having stored therein computer software 1526 (control logic) and/or data. Removable storage unit 1516 represents a floppy disk, magnetic tape, compact disk, DVD, optical storage disk, or any other computer data storage device. Removable storage drive 1514 reads from and/or writes to removable storage unit 1516 in a well-known manner.

Processing device 1500 also includes input/output/display devices 1504, such as touchscreens, LED and LCD displays, monitors, keyboards, pointing devices, etc.

Processing device 1500 further includes a communication or network interface 1520. Communication interface 1520 enables processing device 1500 to communicate with remote devices. For example, communication interface 1520 allows processing device 1500 to communicate over communication networks or mediums 1522 (representing a form of a computer useable or readable medium), such as LANs, WANs, the Internet, etc. Communication interface 1520 may interface with remote sites or networks via wired or wireless connections.

Control logic 1528 may be transmitted to and from processing device 1528 via the communication medium 1522.

Any apparatus or manufacture comprising a computer useable or readable medium having control logic (software) stored therein is referred to herein as a computer program product or program storage device. This includes, but is not limited to, processing device 1500, main memory 1508, secondary storage devices 1510, and removable storage unit 1516. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of circuits, devices, apparatuses, and systems. For instance, embodiments may be included, without limitation, in processing devices (e.g., illustrated in FIG. 15) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 1506 of FIG. 15), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method implemented by an electronic device for implementing a multimode graphical user interface, comprising:
   causing a graphical user interface to be executed in a first mode in which each of a first plurality of user-selectable content identifiers for first content from a first source external to the electronic device are concurrently displayed to a user and are selectable by the user;
   detecting a first period of inactivity of the user with respect to the graphical user interface; and
   in response to detecting the first period of inactivity:
      switching the graphical user interface from the first mode to a second mode, wherein in the second mode:
         the user is guided through each of a second plurality of user-selectable content identifiers in a sequential manner such that focus is automatically provided to each of the second plurality of user-selectable content identifiers one at a time, each of the second plurality of user-selectable content identifiers corresponding to a respective one of the first plurality of user-selectable content identifiers;
         upon selection of a user-selectable content identifier of the second plurality of user-selectable content identifiers for which focus is provided, causing first content corresponding to the selected user-selectable content identifier of the second plurality of user-selectable content identifiers to be played back via the first source;
         responsive to detecting a second period of inactivity with respect to the graphical user interface, automatically switching from displaying the second plurality of user-selectable content identifiers in the sequential manner to displaying a third plurality of user-selectable content identifiers for second content from a second source that is external to the electronic device in a sequential manner such that focus is automatically provided to each of the third plurality of user-selectable content identifiers one at a time; and
         upon selection of a user-selectable content identifier of the third plurality of user-selectable content identifiers for which focus is provided, causing second content corresponding to the selected user-selectable content identifier of the third plurality of user-selectable content identifiers to be played back via the second source.

2. The method of claim 1, wherein each of the second plurality of user-selectable content identifiers of the graphical user interface is an enlarged version of the corresponding respective one of the first plurality of user-selectable content identifiers.

3. The method of claim 1, wherein in the second mode:
   one or more prompts are displayed to the user via the graphical user interface before any of the second plurality of user-selectable content identifiers of the graphical user interface is displayed to the user.

4. The method of claim 1, wherein the first plurality of user-selectable content identifiers is the same as the second plurality of user-selectable content identifiers.

5. The method of claim 1, wherein focus is automatically provided to each of the second plurality of user-selectable content identifiers one at a time by increasing the brightness of each of the second plurality of user-selectable content identifiers one at a time.

6. An apparatus configured to be coupled to a plurality of content-providing devices that are external to the apparatus, comprising:
   a timer configured to detect a first period of inactivity of a user with respect to a graphical user interface for browsing content; and
   rendering logic configured to, in response to the timer detecting the first period of inactivity, cause the graphical user interface to guide the user through a first plurality of user-selectable content identifiers for first content from a first device of the plurality of content-providing devices that are external to the apparatus in a sequential manner such that focus is automatically provided to each of the first plurality of user-selectable content identifiers one at a time,
   wherein the timer is further configured to detect a second period of inactivity with respect to the graphical user interface,
   wherein the rendering logic is further configured to, in response to the timer detecting the second period of inactivity of the user with respect to the graphical user interface, automatically switch from causing the graphical user interface to guide the user through the first plurality of user-selectable content identifiers to causing the graphical user interface to guide the user through a second plurality of user-selectable content identifiers for second content from a second device of the plurality of content-providing devices that are external to the apparatus in a sequential manner such that focus is automatically provided to each of the second plurality of user-selectable content identifiers one at a time;
   wherein selection of a first user-selectable content identifier of the first plurality of user-selectable content identifiers causes first content associated with the selected, first user-selectable content identifier to be retrieved from the first device that is external to the apparatus for playback by a display device coupled to the apparatus; and wherein selection of a second user-selectable content identifier of the second plurality of user-selectable content identifiers causes second content associated with the selected, second user-selectable content identifier to be retrieved from the second device that is external to the apparatus for playback by the display device.

7. The apparatus of claim 6, wherein the rendering logic is further configured to display one or more prompts to the user via the graphical user interface before any of the first plurality of user-selectable content identifiers are displayed to the user.

8. The apparatus of claim 7, wherein the rendering logic is further configured to display a first suggested search query with each of the first plurality of user-selectable content identifiers displayed to the user and a second suggested search query with each of the second plurality of user-selectable content identifiers displayed to the user.

9. The apparatus of claim 8, wherein the first suggested search query and the second suggested search query are user-selectable.

10. The apparatus of claim 7, further comprising:
an input interface configured to:
receive a voice-based search query during display of at least each of the first plurality of user-selectable content identifiers and each of the second plurality of user-selectable content identifiers that are being displayed to the user; and
executing the voice-based search query with respect to at least one of the plurality of content-providing devices.

11. The apparatus of claim 6, wherein the apparatus further comprises a content-providing device that is internal to the apparatus.

12. The apparatus of claim 6, wherein focus is automatically provided to each of the first plurality of user-selectable content identifiers one at a time by increasing the brightness of each of the first plurality of user-selectable content identifiers one at a time.

13. The apparatus of claim 6, wherein the first device is a first Internet streaming device, and the second device is a second Internet streaming device.

14. A system, comprising:
one or more processing units; and
a memory coupled to the one or more processing units, the memory storing instructions, which, when executed by the one or more processing units, are configured to perform operations, the operations comprising:
detecting a first period of inactivity of a user with respect to a graphical user interface for browsing content;
in response to detecting the first period of inactivity, causing a graphical user interface to guide the user through a first plurality of user-selectable content identifiers for first content from a first source that is external to the system in a sequential manner such that focus is automatically provided to each of the first plurality of user-selectable content identifiers one at a time;
detecting a second period of inactivity with respect to the graphical user interface; and
in response to detecting the second period of inactivity, automatically switching from causing the graphical user interface to guide the user through the first plurality of user-selectable content identifiers to causing the graphical user interface to guide the user through a second plurality of user-selectable content identifiers for second content from a second source that is external to the system in a sequential manner such that focus is automatically provided to each of the second plurality of user-selectable content identifiers one at a time, wherein selection of a first user-selectable content identifier of the first plurality of user-selectable first content identifiers causes first content associated with the selected, first user-selectable content identifier to be retrieved from the first source that is external to the system for playback by a display device coupled to the system; and wherein selection of a second user-selectable content identifier of the second plurality of user-selectable content identifiers causes second content associated with the selected, second user-selectable content identifier be retrieved from the second source that is external to the system for playback by the display device.

15. The system of claim 14, wherein the operations further comprise displaying one or more prompts to the user via the graphical user interface before any of the first plurality of user-selectable content identifiers are displayed to the user.

16. The system of claim 14, wherein the operations further comprise displaying a first suggested search query with each of the first plurality of user-selectable content identifiers displayed to the user and a second suggested search query with each of the second plurality of user-selectable content identifiers displayed to the user.

17. The system of claim 16, wherein the first suggested search query and the second suggested search query are user-selectable.

18. The system of claim 14, the operations further comprising:
receiving a voice-based search query during display of any of the first plurality of user-selectable content identifiers and the second plurality of user-selectable content identifiers that are being displayed to the user; and
executing the voice-based search query with respect to at least one of the first source and the second source.

19. The system of claim 14, wherein focus is automatically provided to each of the first plurality of user-selectable content identifiers one at a time by increasing the brightness of each of the first plurality of user-selectable content identifiers one at a time.

20. The system of claim 14, wherein the first source is a first Internet streaming device, and the second source is a second Internet streaming device.

* * * * *

UNITED STATES PATENT AND TRADEMARK OFFICE
CERTIFICATE OF CORRECTION

PATENT NO. : 10,671,253 B2
APPLICATION NO. : 15/249124
DATED : June 2, 2020
INVENTOR(S) : Einaudi et al.

Page 1 of 1

It is certified that error appears in the above-identified patent and that said Letters Patent is hereby corrected as shown below:

In the Claims

In Column 30, Line 28, in Claim 14, after "identifier" insert -- to --.

Signed and Sealed this
Eighteenth Day of August, 2020

Andrei Iancu
*Director of the United States Patent and Trademark Office*